(12) United States Patent
Holecek et al.

(10) Patent No.: US 7,953,560 B2
(45) Date of Patent: May 31, 2011

(54) METHOD FOR MEASURING DOCTOR BLADE GEOMETRIC DEVIATIONS

(75) Inventors: Thomas Allen Holecek, Lexington, KY (US); Robert L. Paterson, Nicholasville, KY (US)

(73) Assignee: Lexmark International, Inc., Lexington, KY (US)

( * ) Notice: Subject to any disclaimer, the term of this patent is extended or adjusted under 35 U.S.C. 154(b) by 710 days.

(21) Appl. No.: 11/770,116

(22) Filed: Jun. 28, 2007

(65) Prior Publication Data

US 2008/0162073 A1 Jul. 3, 2008

Related U.S. Application Data

(63) Continuation-in-part of application No. 11/616,956, filed on Dec. 28, 2006.

(51) Int. Cl.
*G01B 3/44* (2006.01)
*G01B 3/52* (2006.01)
*G01B 5/28* (2006.01)
*G01B 5/30* (2006.01)

(52) U.S. Cl. ............. 702/35; 702/34; 399/274; 382/141

(58) Field of Classification Search .................... 702/34, 702/35; 399/274; 382/141
See application file for complete search history.

(56) References Cited

U.S. PATENT DOCUMENTS

| | | | |
|---|---|---|---|
| 5,570,186 A * | 10/1996 | Satzger et al. | 356/613 |
| 5,654,799 A | 8/1997 | Chase et al. | |
| 5,786,042 A * | 7/1998 | Inoue et al. | 428/1.3 |
| 6,504,957 B2 * | 1/2003 | Nguyen et al. | 382/209 |
| 6,830,659 B2 * | 12/2004 | Sovijarvi | 162/263 |
| 2003/0110610 A1 * | 6/2003 | Duquette et al. | 29/407.09 |
| 2004/0123965 A1 * | 7/2004 | Isometsa et al. | 162/198 |
| 2005/0072135 A1 * | 4/2005 | Kormann | 56/500 |
| 2007/0085904 A1 * | 4/2007 | Heyworth | 348/82 |

* cited by examiner

*Primary Examiner* — Eliseo Ramos Feliciano
*Assistant Examiner* — Janet L Suglo

(57) ABSTRACT

A method for measuring geometric deviations of a doctor blade using an apparatus, including initializing the apparatus, mounting the doctor blade to a doctor blade holding device, illuminating the doctor blade with light, positioning a first portion of the doctor blade at an optical axis of a camera, obtaining a first image signal from the camera that corresponds to the first portion of the doctor blade, generating a first doctor blade geometry value associated with the first image signal, and determining if a first geometric deviation of the doctor blade is within acceptable tolerance using the first doctor blade geometry value.

23 Claims, 19 Drawing Sheets

METHOD FOR MEASURING DOCTOR BLADE GEOMETRIC DEVIATIONS

CROSS-REFERENCE TO RELATED APPLICATIONS

This is a continuation-in-part of U.S. patent application Ser. No. 11/616,956, entitled "APPARATUS FOR MEASURING DOCTOR BLADE GEOMETRIC DEVIATIONS", filed Dec. 28, 2006.

BACKGROUND OF THE INVENTION

1. Field of the Invention

The present invention relates to a doctor blade, and, more particularly, to a method for measuring doctor blade geometric deviations.

2. Description of the Related Art

Electrophotographic image forming devices, such as laser printers, include a drum having a rigid cylindrical surface that is coated along a defined length of its outer surface with a photoconductive material. The surface of the photoconductive drum is charged to a uniform electrical potential and then selectively exposed to light in a pattern corresponding to an original image. Those areas of the surface of the photoconductive drum exposed to light are discharged thus forming a latent electrostatic image on the photoconductive surface. A developer material, such as toner, having an electrical charge such that the toner is attracted to the photoconductive surface is brought into contact with the photoconductive surface.

The toner is stored in a toner reservoir adjacent to the photoconductive drum. A doctor blade and a developer roller are positioned between the toner reservoir and the photoconductive drum for controlling the amount of toner that is transferred to the photoconductive drum. Referring to FIGS. 1A and 1B, a doctor blade 10 may be, for example an elongate member having a longitudinal extent 12, for example, in the Z-axis direction, such that the longitudinal extent 12 would extend across the width of the developer roller. Adjacent a longitudinal edge 14 of doctor blade 10 there is formed a curved radial surface 16 having a radius 18, such that doctor blade 10 resembles a J-shape when viewed down the Z-axis as in the side view of FIG. 1B. Ideally, curved radial surface 16 is designed to contact the developer roller along a line of contact to meter the amount of toner transferred to the photoconductive drum. The ideal radius 18 may vary depending upon the application, but in one example is 700 microns.

It is important that the doctor blade make uniform and consistent contact across the entire length of the developer roller. Failure of the doctor blade to make uniform and consistent contact across the entire length of the developer roller will result in uneven toner amounts being transferred to the photoconductive drum, thereby resulting in inconsistent and unacceptable print quality.

Accordingly, it is highly desired that the doctor blade geometry be maintained within strict limits relating to linear straightness along the longitudinal extent 12 at the anticipated line of contact, and relating to the consistency of the radius 18 of the curved radial surface 16 along longitudinal extent 12 of doctor blade 10.

What is needed in the art is method for measuring doctor blade geometric deviations.

SUMMARY OF THE INVENTION

The present invention relates to a method for measuring doctor blade geometric deviations.

The terms "first", "second", etc. preceding an element name, e.g., first light source, second light source, etc., are used for identification purposes to distinguish between similar elements, and are not intended to necessarily imply order, nor are the terms "first", "second", etc., intended to preclude the inclusion of additional similar elements.

The invention, in one form thereof, is directed to a method for measuring geometric deviations of a doctor blade using an apparatus, including: initializing the apparatus; mounting the doctor blade to a doctor blade holding device; illuminating the doctor blade with light; positioning a first portion of the doctor blade at an optical axis of a camera; obtaining a first image signal from the camera that corresponds to the first portion of the doctor blade; generating a first doctor blade geometry value associated with the first image signal; and determining if a first geometric deviation of the doctor blade is within acceptable tolerance using the first doctor blade geometry value.

The invention, in another form thereof, is directed to a method for measuring geometric deviations of a doctor blade using an apparatus, including: initializing the apparatus; mounting the doctor blade to a doctor blade holding device; illuminating the doctor blade with light; positioning a first portion of the doctor blade at an optical axis of a camera; obtaining a first image signal from the camera that corresponds to the first portion of the doctor blade; generating a first doctor blade geometry value associated with the first image signal; determining if a first geometric deviation of the doctor blade is within acceptable tolerance using the first doctor blade geometry value; moving the doctor blade holding device so a second portion of the doctor blade is on the optical axis of the camera; obtaining a third image signal from the camera that corresponds to the second portion of the doctor blade; generating a second doctor blade geometry value associated with the third image signal; and determining if a second geometric deviation of the doctor blade is within acceptable tolerance using the second doctor blade geometry value.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1A:
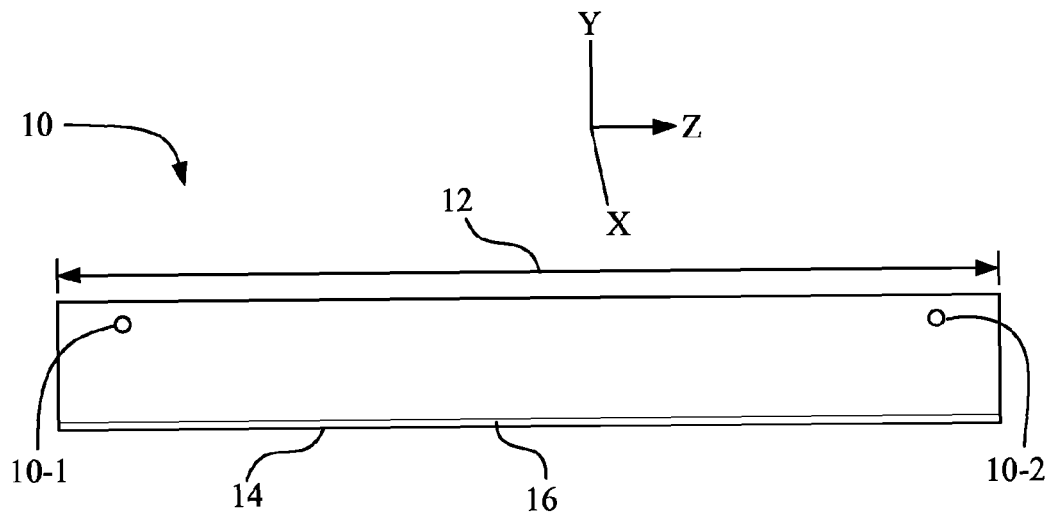
FIG. 1A is a front view of a doctor blade.
Figure 1B:
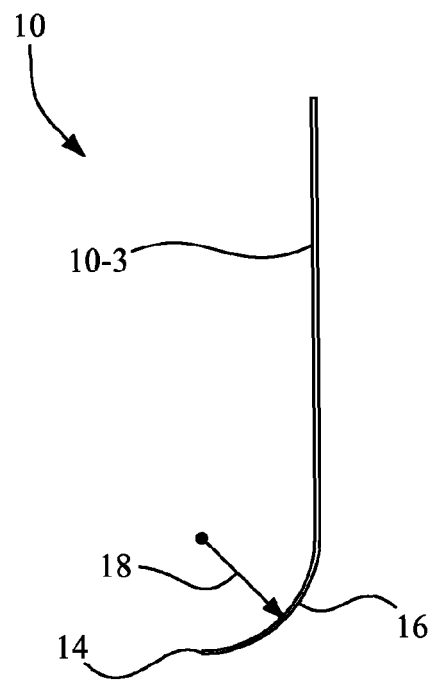
FIG. 1B is a side view of the doctor blade of FIG. 1A.
Figure 2:
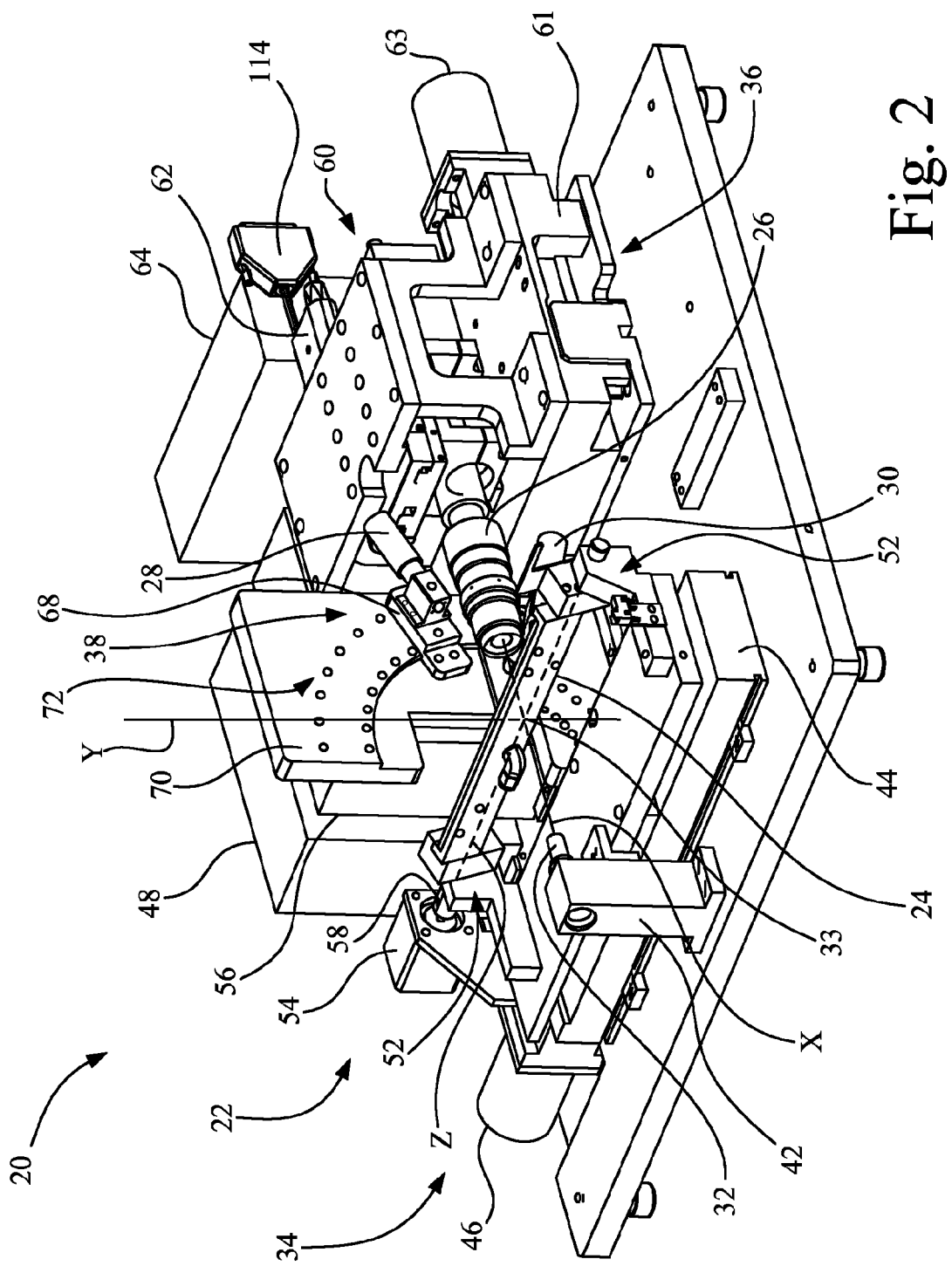
FIG. 2 is a perspective view of an apparatus for measuring geometric deviations in a doctor blade.
Figure 3:
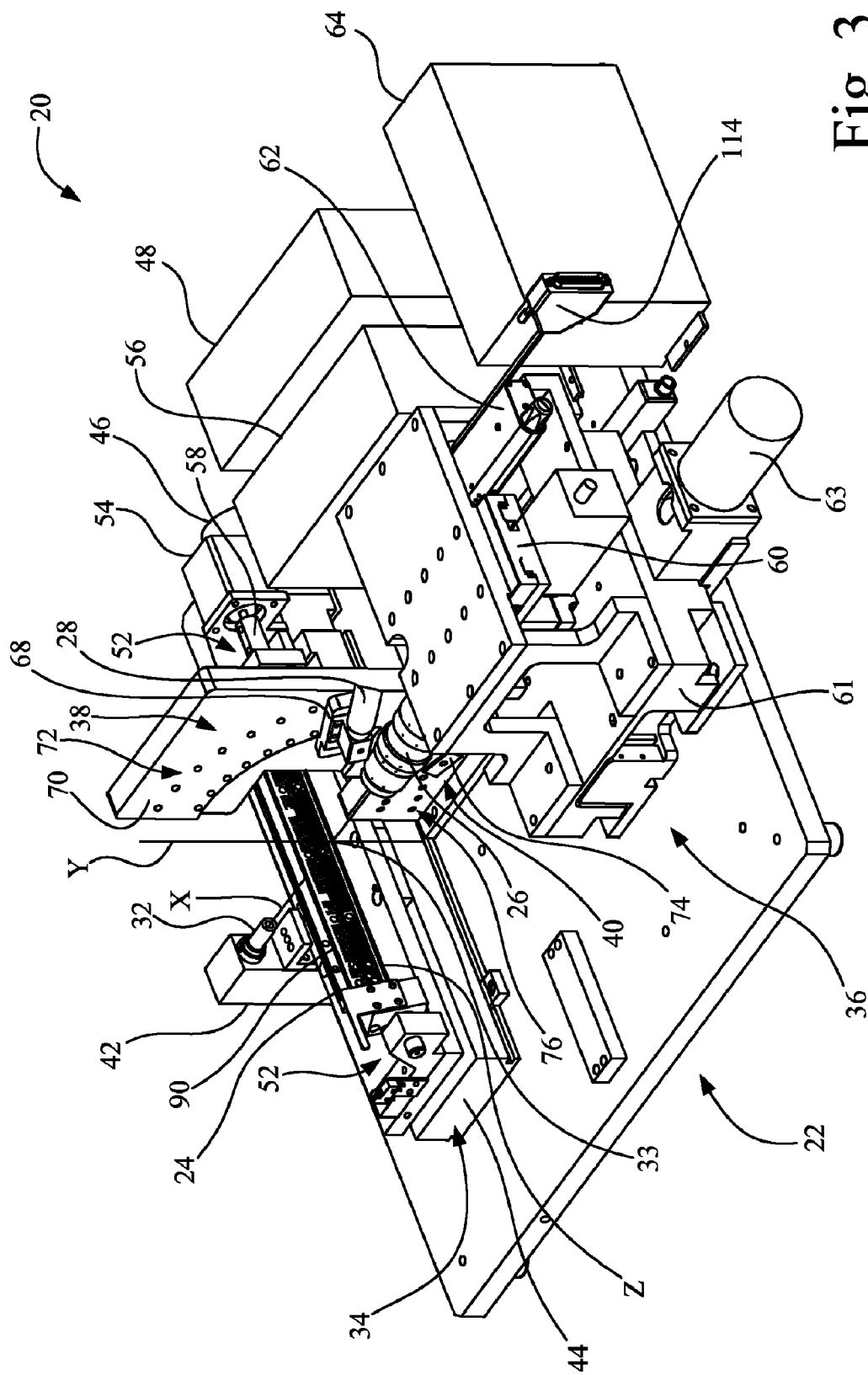
FIG. 3 is another perspective view of the apparatus for measuring geometric deviations in a doctor blade.

Referring now to the drawings and particularly to FIGS. 2-5, there is shown an apparatus 20 for measuring geometric deviations in a doctor blade, such as doctor blade 10 shown in FIGS. 1A and 1B. Apparatus 20 includes a mounting fixture 22, a doctor blade holding device 24, a camera 26, a first light source 28, a second light source 30, and a third light source 32.

Camera 26 may be, for example, a charge-coupled device (CCD) having a field of view of approximately one millimeter. Camera 26 defines an optical axis, which in turn defines an X-axis in a Cartesian coordinate system that will be used in describing the orientation of components of apparatus 20. A Y-axis is oriented vertically orthogonal to the X-axis. A Z-axis is oriented orthogonal to both the X-axis and the Y-axis. An origin 33 of the Cartesian coordinate system defines an intersection point, which may also be referenced by element number 33.

Mounting fixture 22 includes a mount 34 for mounting doctor blade holding device 24, a mount 36 for mounting camera 26, an angular mount 38 for mounting first light source 28, an angular mount 40 for mounting second light source 30, and a mount 42 for mounting third light source 32. Mounting fixture 22 is configured to move doctor blade holding device 24, and in turn to move doctor blade 10, along the Z-axis while mounting fixture 22 holds camera 26, first light source 28, and second light source 30 in a selected stationary position. Third light source 32 may be mounted in a fixed position.

Mount 34 is configured to provide linear movement of doctor blade holding device 24 along the Z-axis, and rotational movement of doctor blade holding device 24 around the Z-axis. Doctor blade holding device 24 is configured to mount a doctor blade, such as doctor blade 10. Mount 34 positions doctor blade holding device 24 such that a longitudinal extent 12 of doctor blade 10 is parallel to the Z-axis, and wherein a portion of doctor blade 10 to be measured is positioned at intersection point 33.

Mount 34 includes a slide mount 44, a motor 46, and a motor controller 48 to facilitate automated linear movement of doctor blade holding device 24 along the Z-axis. Motor 46 may be, for example, a stepper motor, and may be rotatably coupled to slide mount 44 by a lead screw arrangement 50 (see FIG. 5) of a type well known in the art to translate rotary motion into linear motion along the Z-axis. Motor 46 is electrically coupled to motor controller 48.

Mount 34 further includes a pivot 52, a motor 54, and a motor controller 56 to facilitate automated pivoting movement of doctor blade holding device 24 around the Z-axis. Motor 54 may be, for example, a stepper motor, and may be directly coupled by a coupler 58 to pivot 52. Motor 54 is electrically coupled to motor controller 56.

Mount 36 is configured to provide linear movement of camera 26 along the X-axis, and to provide linear movement of camera 26 along the Y-axis. Camera 26 is separated by a selectable distance D (see FIG. 6) from intersection point 33 along the X-axis. Mount 36 includes a movable slide mount 60, a motor 62, and a motor controller 64 to facilitate automated movement of camera 26 along the X-axis. Mount 36 may further include a movable vertical mount 61 and a motor 63 to facilitate automated movement of camera 26 to provide elevation adjustment of the optical axis (X-axis) up or down in the plane of the Y-axis. Alternatively, Y-axis elevation adjustment of the optical axis (X-axis) up or down in the plane of the Y-axis may be accomplished using shims (not shown).

Motor 62 may be, for example, a stepper motor, and may be rotatably coupled to slide mount 60 by a lead screw arrangement 66 (see FIG. 5) of a type well known in the art to translate rotary motion into linear motion along the X-axis. Motor 62 is electrically coupled to motor controller 64. Slide mount 60 provides adjustable linear positioning of camera 26 along the X-axis to adjust a focus of camera 26 relative to doctor blade 10, e.g., establishing a focal point at intersection point 33.

Motor 63 may be, for example, a stepper motor, and may be rotatably coupled to vertical mount 61 by a lead screw arrangement 67 (see FIG. 5) of a type well known in the art to translate rotary motion into linear motion along the Y-axis. Motor 63 is electrically coupled to motor controller 64, which serves as the motor controller for both of motors 62 and 63. Vertical mount 61 provides adjustable linear positioning of camera 26 along the Y-axis to adjust an elevation of camera 26 relative to doctor blade 10. Vertical mount 61 may be, for example, in the form of a scissor jack arrangement. As an alternative, elevation adjustment may be accomplished for example by a cam/cam follower arrangement.

Figure 6:
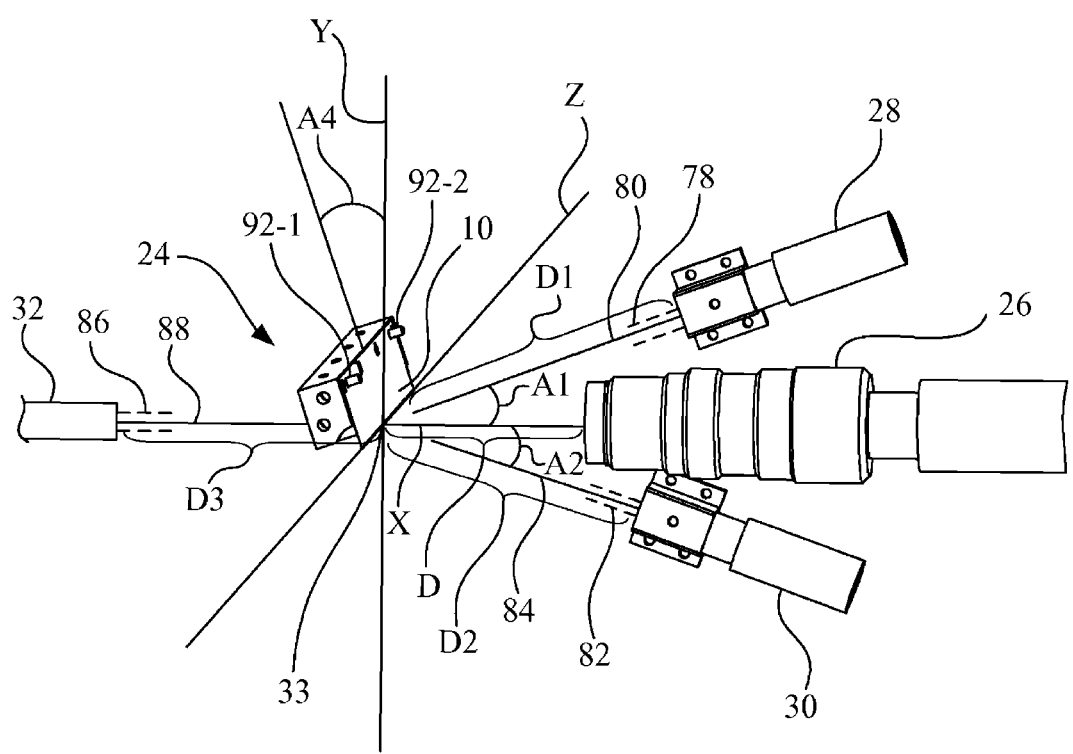
FIG. 6 is a diagrammatic illustration of an orientation of the camera and the multiple light sources of the apparatus of FIGS. 2-4 during a doctor blade radius measurement.

Referring also to FIG. 6, angular mount 38 is configured to provide rotational movement of first light source 28 around the Z-axis. Angular mount 38 includes a pivot 68 and a mounting plate 70. Mounting plate 70 includes a plurality of holes 72 arranged in a pattern formed by two concentric arcs relative to the Z-axis. First light source 28 is attached to pivot

68. Pivot 68 is attach by fasteners, such as bolts, in a set of the plurality of holes 72 to position first light source 28 at the desired angle A1 with respect to the X-axis (see FIG. 6). Thus, angular mount 38 provides adjustable angular positioning of first light source 28 relative to the X-axis.

Angular mount 40 is configured to provide rotational movement of second light source 30 around the Z-axis. Angular mount 40 includes a pivot 74 and mounting plate 70, which is shared with angular mount 38. Mounting plate 70 further includes a plurality of holes 76 arranged in a pattern formed by two concentric arcs relative to the Z-axis. Second light source 30 is attached to pivot 74. Pivot 74 is attached by fasteners, such as bolts, in a set of the plurality of holes 76 to position second light source 30 at the desired angle A2 with respect to the X-axis (see FIG. 6). Thus, angular mount 40 provides adjustable angular positioning of second light source 30 relative to the X-axis.

Mount 42 is configured as a fixed mount to position third light source 32 in parallel alignment with the X-axis, while permitting manual elevation adjustment of third light source 32 up or down in the plane of the Y-axis using shims (not shown).

Each of light sources 28, 30 and 32 are configured to produce a respective collimated light beam. Each of light sources 28, 30 and 32 may include, for example, a light emitting diode (LED), an incandescent lamp, an arc lamp, or a laser. Each of light sources 28, 30 and 32 may further include any associated lenses for collimating the generated light, in a manner known in the art. Each of light sources 28, 30 and 32 may further include a respective light intensity control, which may manually or automatically control the intensity of the respective light beam.

Referring to FIG. 6, first light source 28 generates a first collimated light beam 78 having a first central axis 80. First central axis 80 of first collimated light beam 78 is positioned by angular mount 38 on the X-Y plane of the Cartesian coordinate system. First light source 28 is positioned by angular mount 38 to direct first collimated light beam 78 toward the intersection point 33. First light source 28 is separated by a distance D1 from intersection point 33 along first central axis 80. First central axis 80 is angularly disposed from the X-axis by angle A1 that is positive with respect to the X-axis. A position of first light source 28 may be selected, for example, such that angle A1 is 90 degrees or less. In the component positions shown, angle A1 is about 20 degrees.

Second light source 30 generates a second collimated light beam 82 having a second central axis 84. Second central axis 84 of second collimated light beam 82 is positioned by angular mount 40 on the X-Y plane of Cartesian coordinate system. Second light source 30 is positioned by angular mount 40 to direct second collimated light beam 82 toward the intersection point 33. Second light source 30 is separated by a distance D2 from intersection point 33 along second central axis 84. Second central axis 84 is angularly disposed from the X-axis by angle A2 that is negative with respect to the X-axis. A position of second light source 30 may be selected, for example, such that an absolute value of second angle A2 is 90 degrees or less. In the component positions shown, angle A2 is about −20 degrees.

In one embodiment, for example, the position of first light source 28 and the position of second light source 30 are selected such that first angle A1 and second angle A2 are symmetrical with respect to X-axis, e.g., 20 degrees and −20 degrees, respectively.

Third light source 32 generates a third collimated light beam 86 having a third central axis 88. Third light source 32 is positioned by mount 42 to direct third collimated light beam 86 toward the intersection point 33 and toward camera 26. Third light source 32 is separated by a distance D3 from intersection point 33 along third central axis 88. In the present embodiment, third central axis 88 is coincident with the X-axis.

Figure 7:
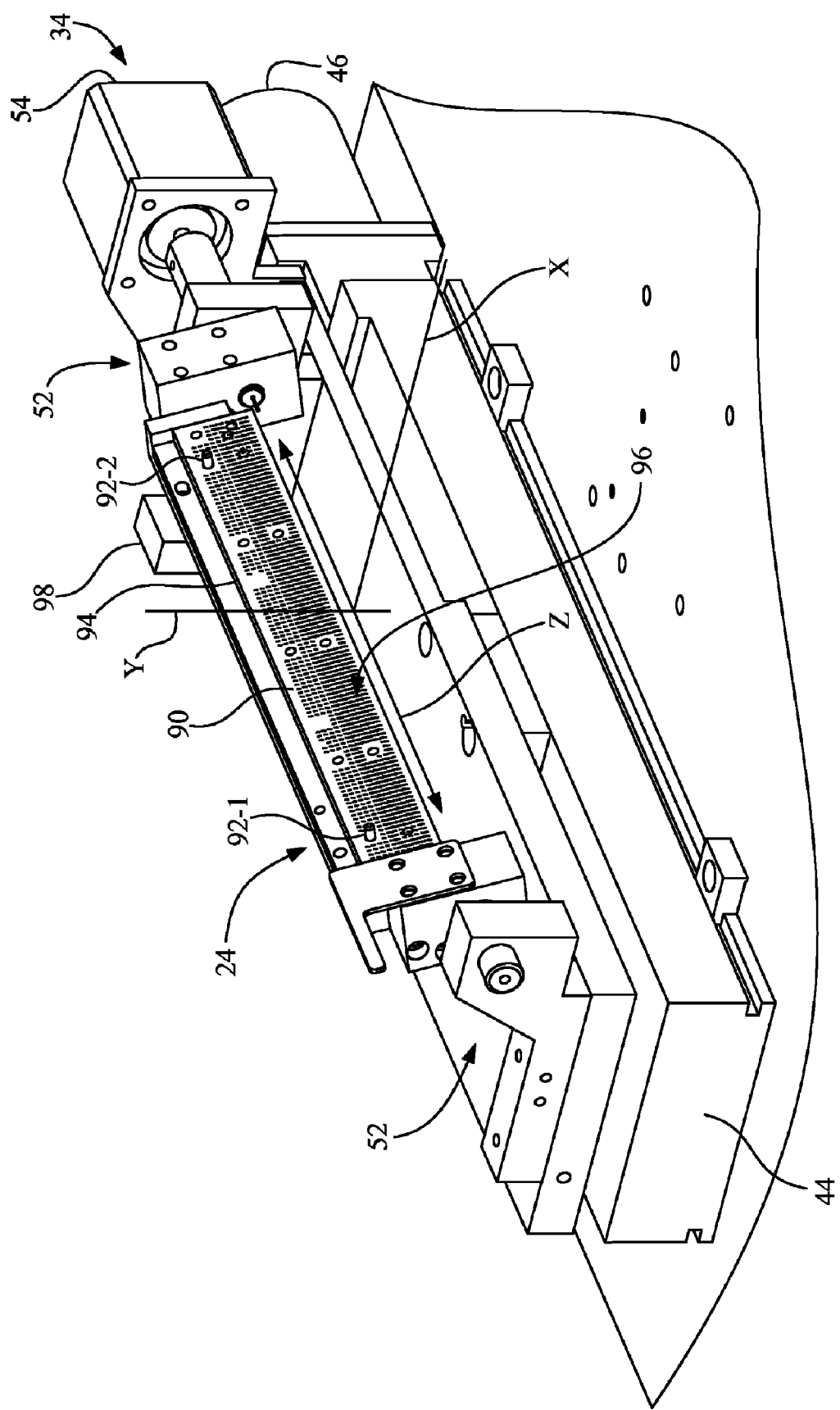
FIG. 7 is a perspective view of a portion of the apparatus of FIGS. 2-4 showing an embodiment of the doctor blade holding device of the apparatus of FIGS. 2-4 that uses vacuum to hold the doctor blade.

Referring also to FIG. 7, doctor blade holding device 24 may include a planar surface 90, serving as an anvil, from which doctor blade positioning pins 92-1, 92-2 extend to engage corresponding holes 10-1, 10-2 in doctor blade 10. In the present embodiment, doctor blade holding device 24 includes a vacuum holding mechanism 94 for holding doctor blade 10 stationary relative to doctor blade holding device 24 against planar surface (anvil) 90 using negative pressure applied to a flat surface 10-3 of doctor blade 10 (see FIG. 1B). As shown in FIG. 7, vacuum holding mechanism 94 is formed by a plurality of passageways 96 that terminate as holes at planar surface 90. The plurality of passageways 96 fluidically connects a vacuum source 98 to the planar surface 90 of doctor blade holding device 24.

Figure 8:
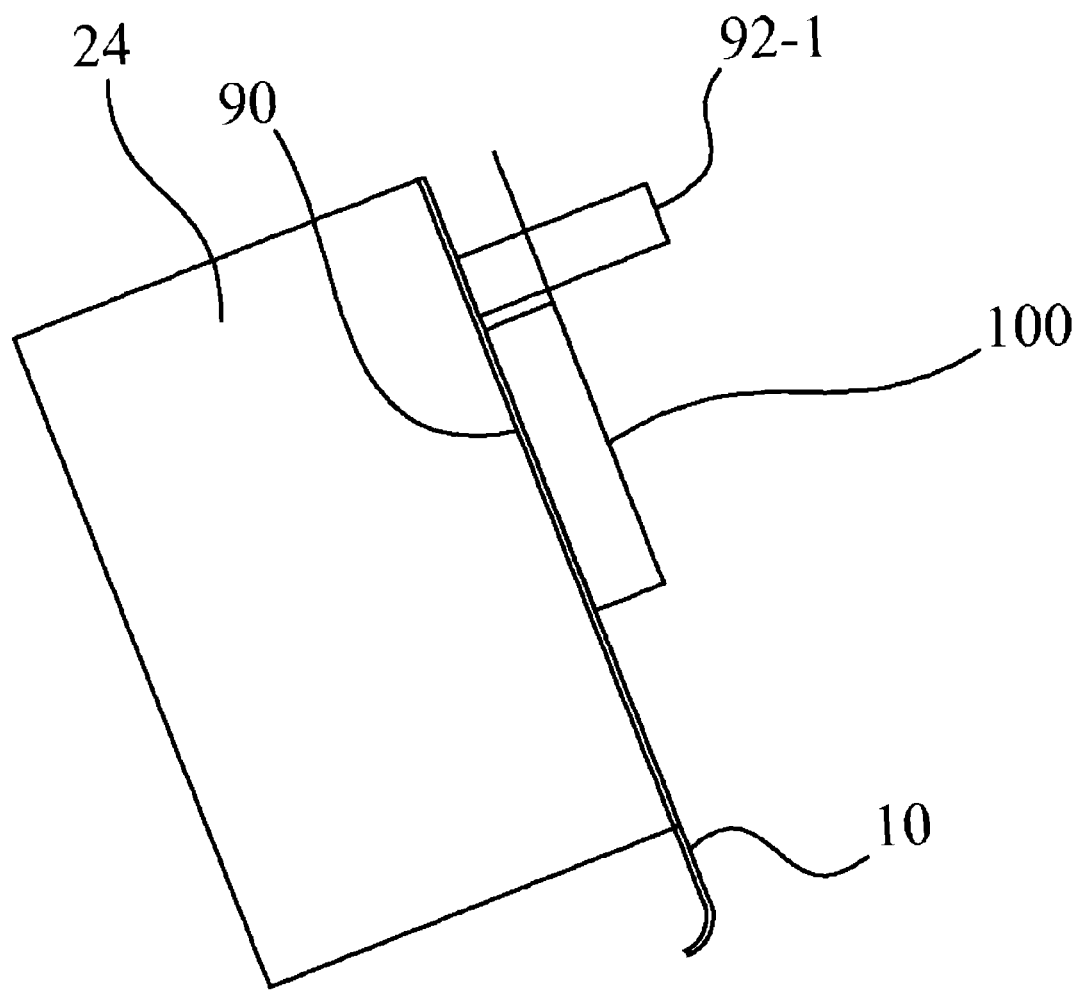
FIG. 8 is a side view of a doctor blade holding device that includes a magnetic holding mechanism for holding doctor blade to the anvil.

Alternatively, as shown in FIG. 8, doctor blade holding device 24 may include a magnetic holding mechanism 100 for holding doctor blade 10 stationary relative to doctor blade holding device 24 against planar surface 90 using magnetic force.

Figure 9:
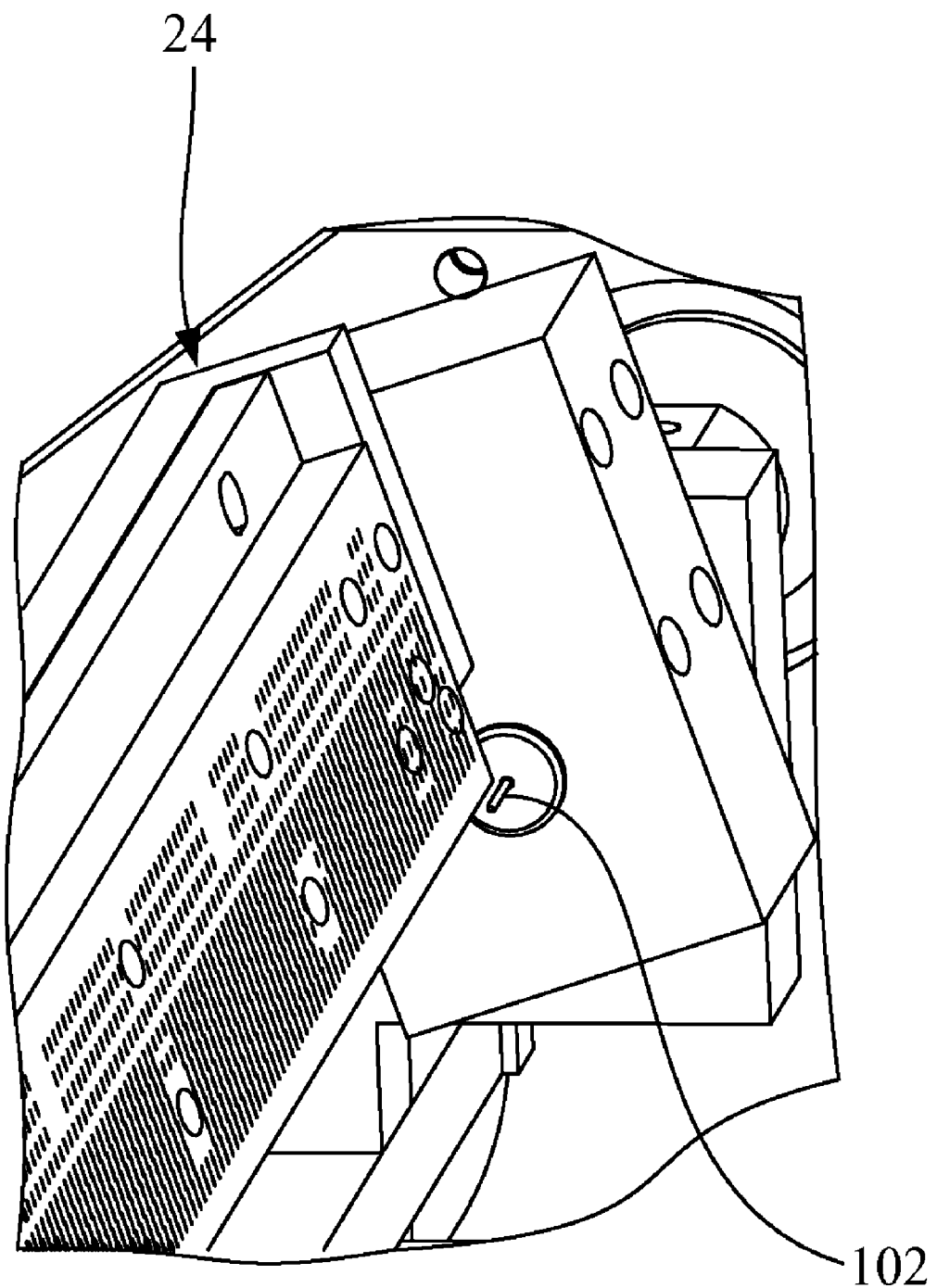
FIG. 9 is a sub-portion of the doctor blade holding device of FIG. 7 showing a Z-axis calibration pin.
Figure 10:
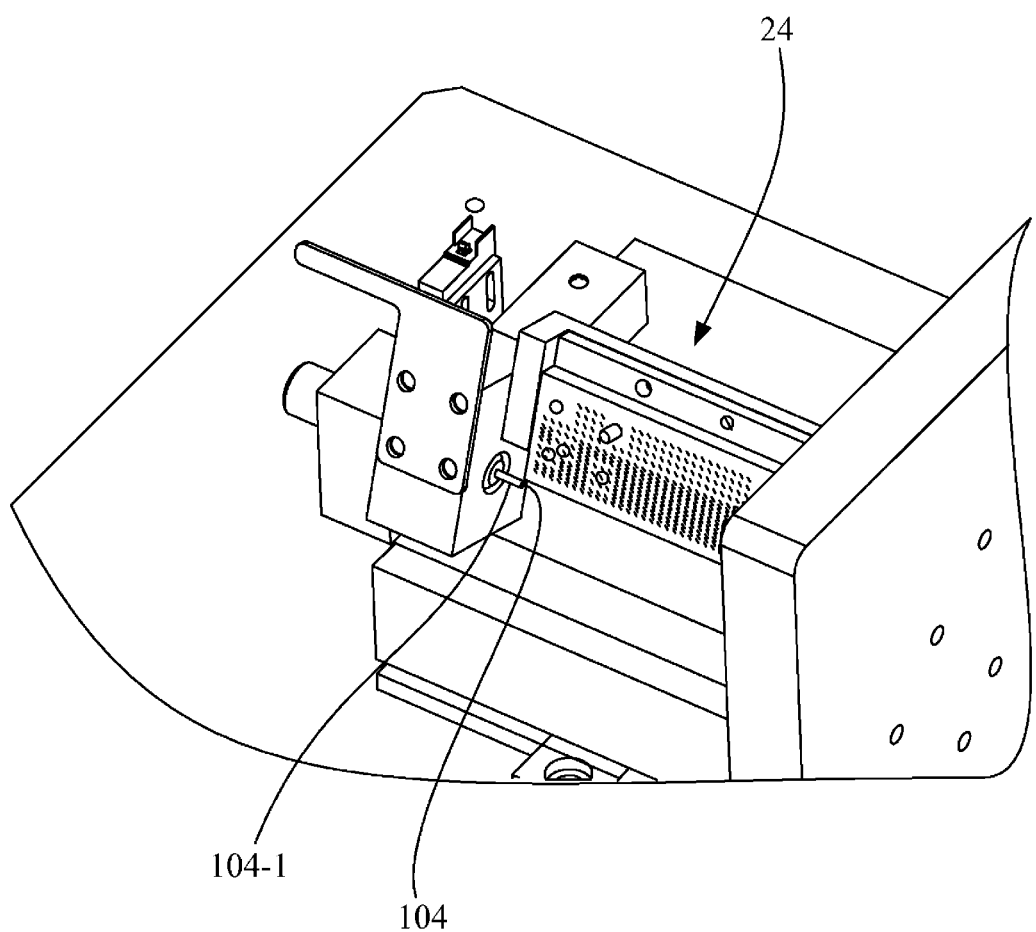
FIG. 10 is a sub-portion of the doctor blade holding device of FIG. 7 showing a radius calibration pin.
Figure 11:
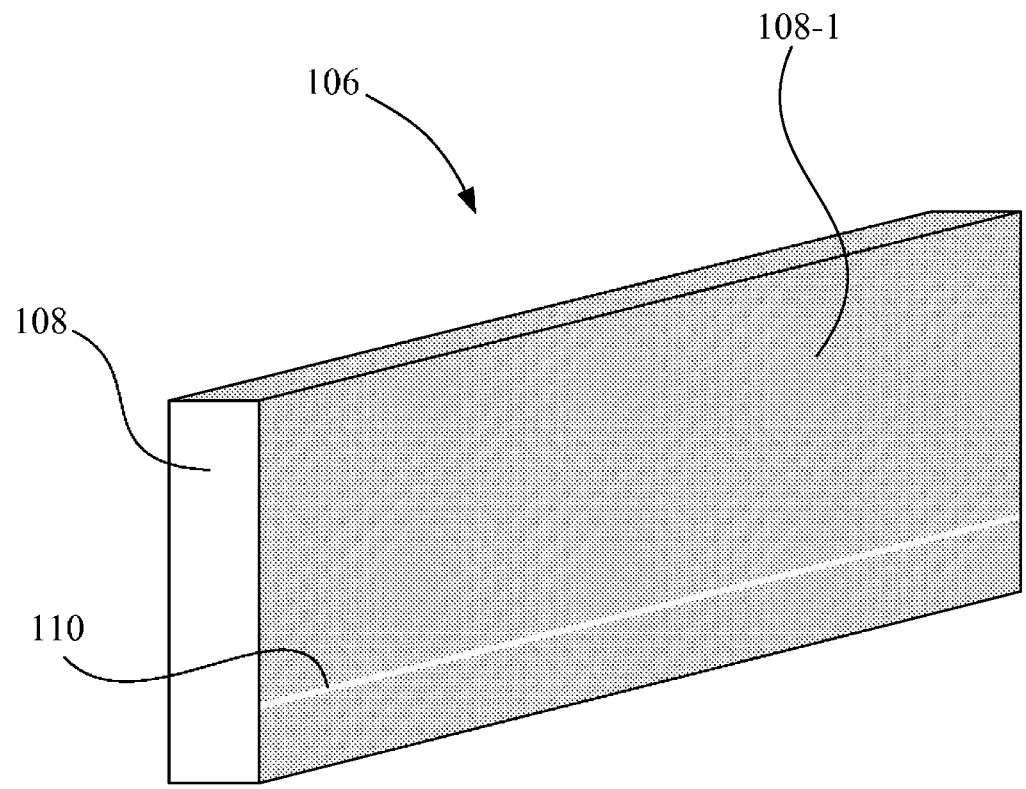
FIG. 11 is an embodiment of a straightness calibration device for use with the apparatus of FIGS. 2-4.

As shown in FIGS. 9-11, in order to facilitate calibration of apparatus 20, there is included a Z-axis (calibration) pin 102, a radius calibration pin 104, and a straightness calibration device 106.

Referring to FIG. 9, Z-axis (calibration) pin 102 is mounted to doctor blade holding device 24. Z-axis pin 102 has a known diameter, such as for example, 600 microns, and extends axially along the Z-axis. The use of Z-axis pin 102 in calibrating apparatus 20 will be described in further detail below.

Referring to FIG. 10, radius calibration pin 104 is mounted to doctor blade holding device 24. Radius calibration pin 104 has a known radius, such as for example, 800 microns, and extends axially along the Z-axis. Radius calibration pin 104 is positioned to face Z-axis pin 102 across origin 33. The use of radius calibration pin 104 in calibrating apparatus 20 will be described in further detail below.

Referring to FIG. 11, there is shown an exemplary straightness calibration device 106. Straightness calibration device 106 is configured for mounting in doctor blade holding device 24 in the normal position of doctor blade 10. Straightness calibration device 106 may be formed, for example, from a transparent, e.g., glass, plate 108 having an opaque coating 108-1 on one side. The opaque coating 108-1 is photo etched to remove a thin line of the opaque coating to form a straight calibration line 110. The line width (vertically) of straight calibration line 110 may be, for example, 100 microns.

Referring again to FIG. 5, there is shown a schematic illustration of apparatus 20 communicatively coupled to a computer 112 via a communications link 114, such as for example, a multi-conductor cable. Alternatively, it is contemplated that communications link 114 may be formed as a wireless connection. In particular, each of camera 26, first light source 28, second light source 30, third light source 32, motor controller 48, motor controller 56, and motor controller 64 is individual communicatively coupled to computer 112 by communications link 114.

Computer 112 may be, for example, a personal computer having a monitor screen 112-1, and further including a processor, memory, and input devices, as is typical in the art. Stored in memory are one or more computer application programs which when executed operates camera 26 and one or more of motor controllers 48, 56, and 64 and one or more of light sources 28, 30, and 32 for calibrating apparatus 20 prior to making measurements of doctor blade 10. Also, stored in memory is a computer application program which when executed operates camera 26 and one or more of motor controllers 48, 56, and 64 and one or more light sources 28, 30, and 32 for measuring geometric deviations in a doctor blade, such as doctor blade 10.

Figure 12:
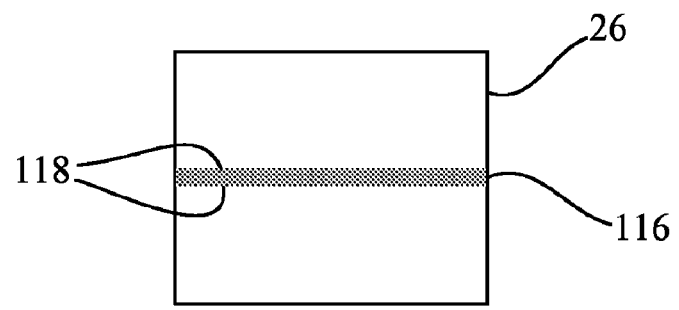
FIG. 12 is a pictorial illustration of the backlighting of the Z-axis pin of FIG. 9 as perceived by the camera in the apparatus of FIGS. 2-4.

For example, during execution of a vertical distance (Y-axis) calibration, computer 112 executes program instructions to operate motor controller 48, so as to move slide mount 44 that mounts doctor blade holding device 24 along the Z-axis until Z-axis pin 102 is moved to the origin 33. Third light source 32 is turned on, such as by discrete switches or by computer 112, to produce third collimated light beam 86, thereby backlighting the Z-axis pin 102 to generate a shadow 116 that is perceived by camera 26, as illustrated in FIG. 12. Camera 26 senses the shadow 116 as two horizontally extending and vertically spaced dark lines 118 corresponding to the known diameter of Z-axis pin 102. Computer 112 then executes program instructions to convert a camera pixel distance between the vertically spaced dark lines to microns per pixel.

Figure 13:
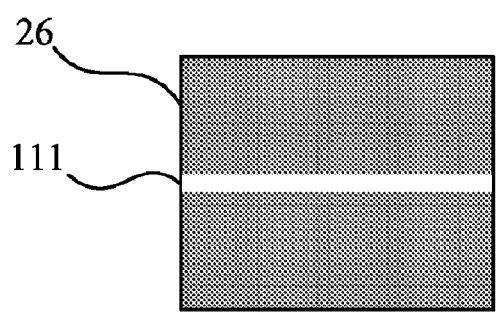
FIG. 13 is a pictorial illustration of the backlighting of the straightness calibration device of FIG. 11 as perceived by the camera in the apparatus of FIGS. 2-4.

Another example of a calibration program is a straightness calibration. The straightness calibration generates a correction for vertical (Y-axis) variations in the slide mount 44 that mounts doctor blade holding device 24 as slide mount 44 is moved along the Z-axis between its movement limits. Straightness calibration device 106 is mounted in doctor blade holding device 24. During execution of the straightness calibration, computer 112 turns on a backlight source, such as third light source 32 to produce third collimated light beam 86, thereby backlighting the straight calibration line 110 formed on straightness calibration device 106. Alternatively, a separate light source may be placed behind straightness calibration device 106. Camera 26 senses the light passing through straight calibration line 110 as a white line 111, as illustrated in FIG. 13, and more particularly senses one of the line edges, e.g., the upper edge, of white line 111 that represents straight calibration line 110.

Computer 112 then controls camera 26 for generating a straightness calibration signal corresponding to the line width (Y-axis variation) of straight calibration line 110 at origin 33, as computer 112 commands motor controller 48 to move slide mount 44 such that doctor blade holding device 24 is moved along the Z-axis. Computer 112 then uses the straightness calibration signal to map a straightness of doctor blade holding device 24 as doctor blade holding device is moved along the Z-axis. The map is then converted into compensation values that are used while measuring geometric deviations in a doctor blade 10 so as to compensate for straightness variations along the Z-axis inherent in apparatus 20, and more particularly, inherent in mount 34, and more particularly, in slide mount 44.

Figure 14:
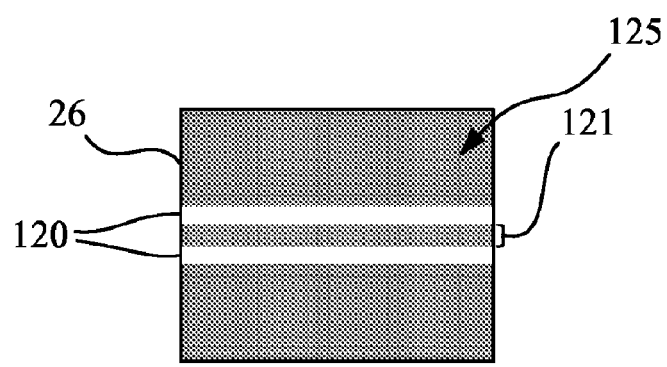
FIG. 14 is a pictorial illustration of the lighting of the radius calibration pin of FIG. 10 as perceived by the camera in the apparatus of FIGS. 2-4.

As another example, during a doctor blade radius calibration, computer 112 executes program instructions to operate motor controller 48, so as to move slide mount 44 that mounts doctor blade holding device 24 along the Z-axis until radius calibration pin 104 is moved to the origin 33. Computer 112 then controls first light source 28 and second light source 30 to generate first collimated light beam 78 and second collimated light beam 82, respectively. First collimated light beam 78 and second collimated light beam 82 are reflected off of an outer curved surface 104-1 of radius calibration pin 104 (see also FIG. 10). Camera 26 senses the reflection of first collimated light beam 78 and second collimated light beam 82 as two horizontally extending and vertically spaced light lines 120, as illustrated in FIG. 14, having a spacing 121 corresponding to the known radius of radius calibration pin 104. Computer 112 then executes program instructions to correlate a number of camera pixels between the two horizontally extending and vertically spaced light lines 120 to the known radius of radius calibration pin 104, with the units being, for example, in microns per camera pixel.

Measuring geometric deviations in a doctor blade, such as doctor blade 10, may include, for example, measuring the straightness of doctor blade 10, i.e., vertical (Y-axis) deviations along the Z-axis, and measuring the doctor blade radius 18 associated with curved radial surface 16 of doctor blade 10 at various points along the longitudinal extent 12 of doctor blade 10.

Figure 15A:
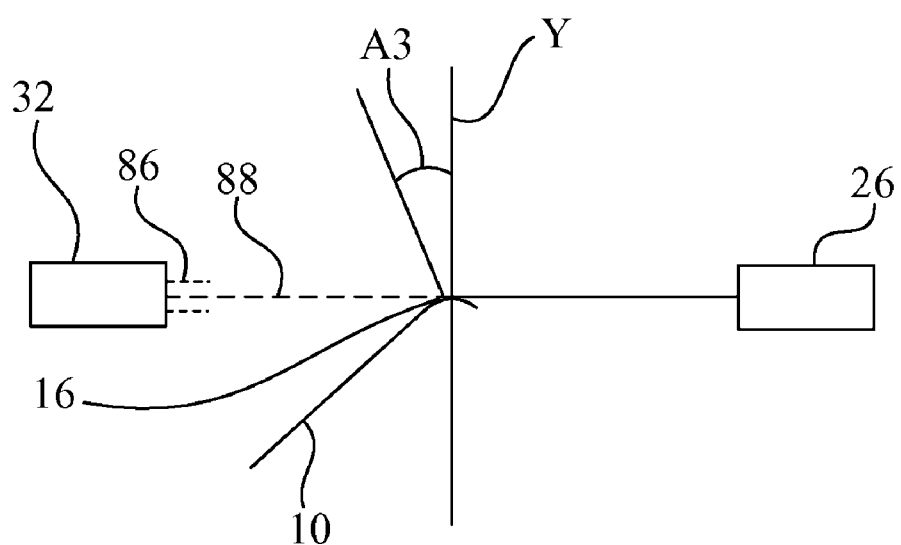
FIG. 15A is a diagrammatic illustration of an orientation of the camera and the backlighting light source of the apparatus of FIGS. 2-4 during a Z straightness measurement of a doctor blade.

During a doctor blade Z straightness measurement illustrated in FIG. 15A, doctor blade 10 is mounted in doctor blade holding device 24. In this example, a measurable length of doctor blade 10 is 216.7 mm. Computer 112 controls third light source 32 to generate third collimated light beam 86, which backlights doctor blade 10 mounted on doctor blade holding device 24. Computer 112 controls motor controller 56 such that motor 54 moves pivot 52 to position doctor blade 10 at an angle A3 offset from the Y-axis, and is positioned such that a tangent of curved radial surface 16 of doctor blade 10 lies on the X-axis, as illustrated in FIG. 15A, with light from third light source 32 being incident on curved radial surface 16. Angle A3 may be, for example, 20 degrees.

Figure 15B:
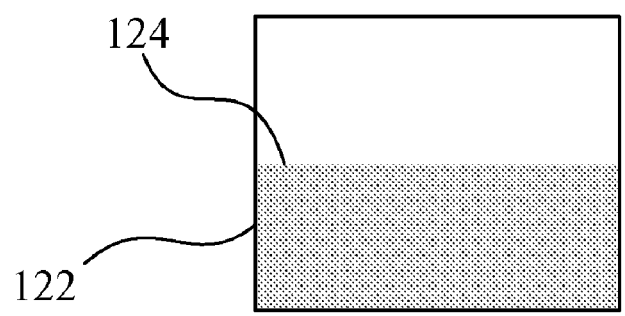
FIG. 15B is a pictorial illustration of the backlighting of the doctor blade as perceived by the camera in the apparatus of FIGS. 2-4 during the Z straightness measurement of the doctor blade of FIG. 15B.

As illustrated in FIG. 15B, camera 26 receives a shadow 122 having an upper horizontally extending shadow edge 124 that corresponds to an edge of doctor blade 10 along curved radial surface 16 at the X-axis tangent based on the light cast by third collimated light beam 86, and senses a vertical elevation of shadow edge 124 at origin 33. Camera 26 generates a straightness signal corresponding to a straightness of doctor blade 10, as computer 112 commands motor controller 48 to move slide mount 44 such that doctor blade holding device 24 and in turn as doctor blade 10 is moved along the Z-axis. The straightness signal constitutes a sampling of the radius of curved radial surface 16 of doctor blade 10. The sampling rate may, for example, correspond to a sampling at each millimeter along the longitudinal extent 12 of doctor blade 10, e.g., 216 times, with the desired sampling rate depending for example on the accuracy desired.

Camera 26 supplies the straightness signal to computer 112 for further processing to determine if the straightness of doctor blade 10 is within an acceptable tolerance. For example, computer 112 may process the straightness signal to take the slope out of the data. Assume that X is the value of the 216 places measured. Also assume that Y is the blade values in microns of the 216 points. Computer 112 then calculates the slope m and the intercept b. The slope is taken out using the equation:

$$y\ \text{new} = Y\ \text{data} - (m*X\ \text{data} + b).$$

The equation representing straightness is:

$$ST = \text{Maximum } y\ \text{new} - \text{minimum } y\ \text{new}.$$

A graph is then drawn on the monitor screen 112-1 of computer 112 of the data without the slope, with the X-axis in millimeters and the Y-axis in microns. The monitor screen 112-1 of computer 112 also displays the Z straightness number ST, and the data is stored in memory. If the Z straightness ST exceeds a predefined limit (e.g., +/−50 microns) then the doctor blade may be marked as "failed".

Figure 4:
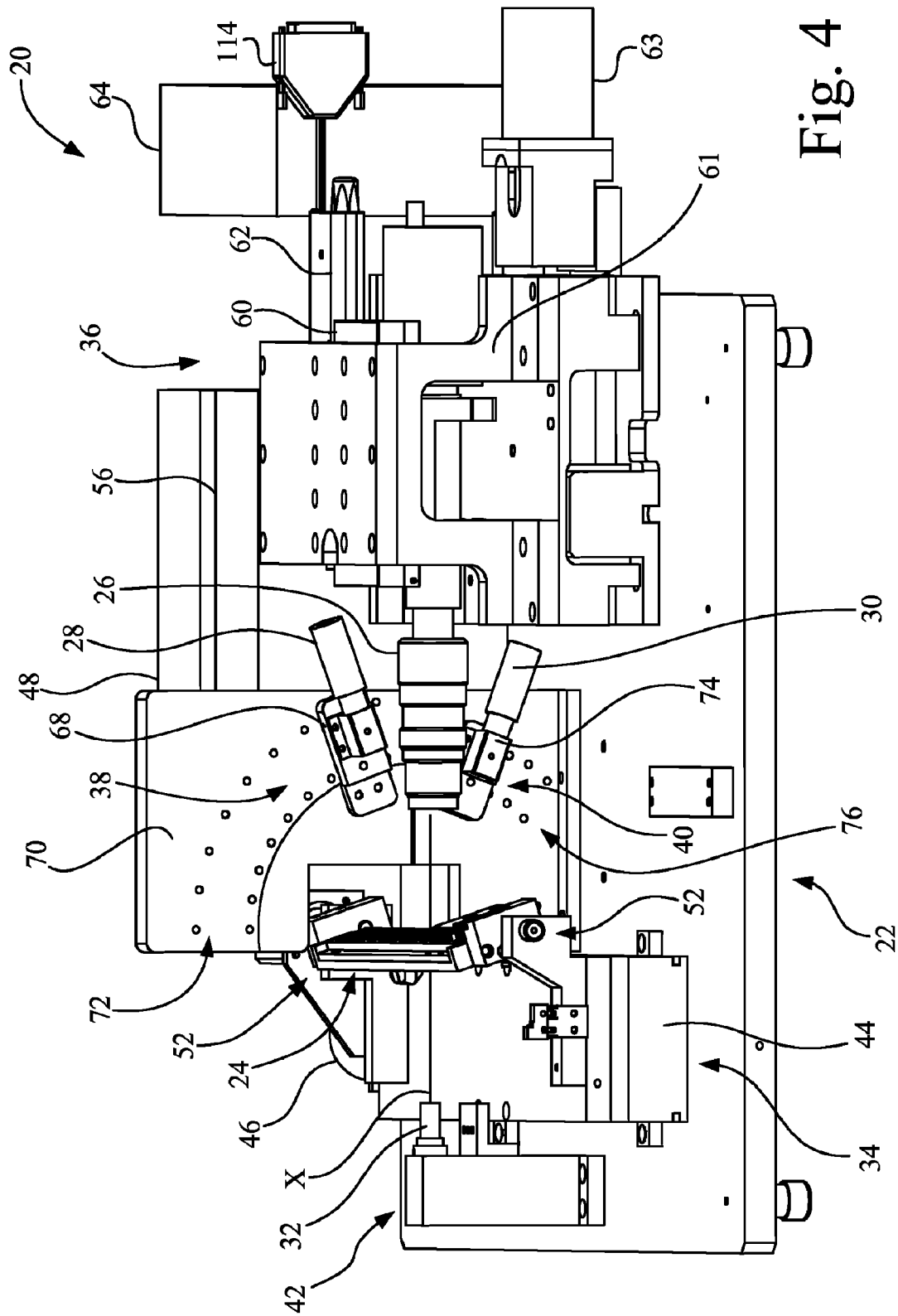
FIG. 4 is a side view of the apparatus of FIGS. 2 and 3.
Figure 5:
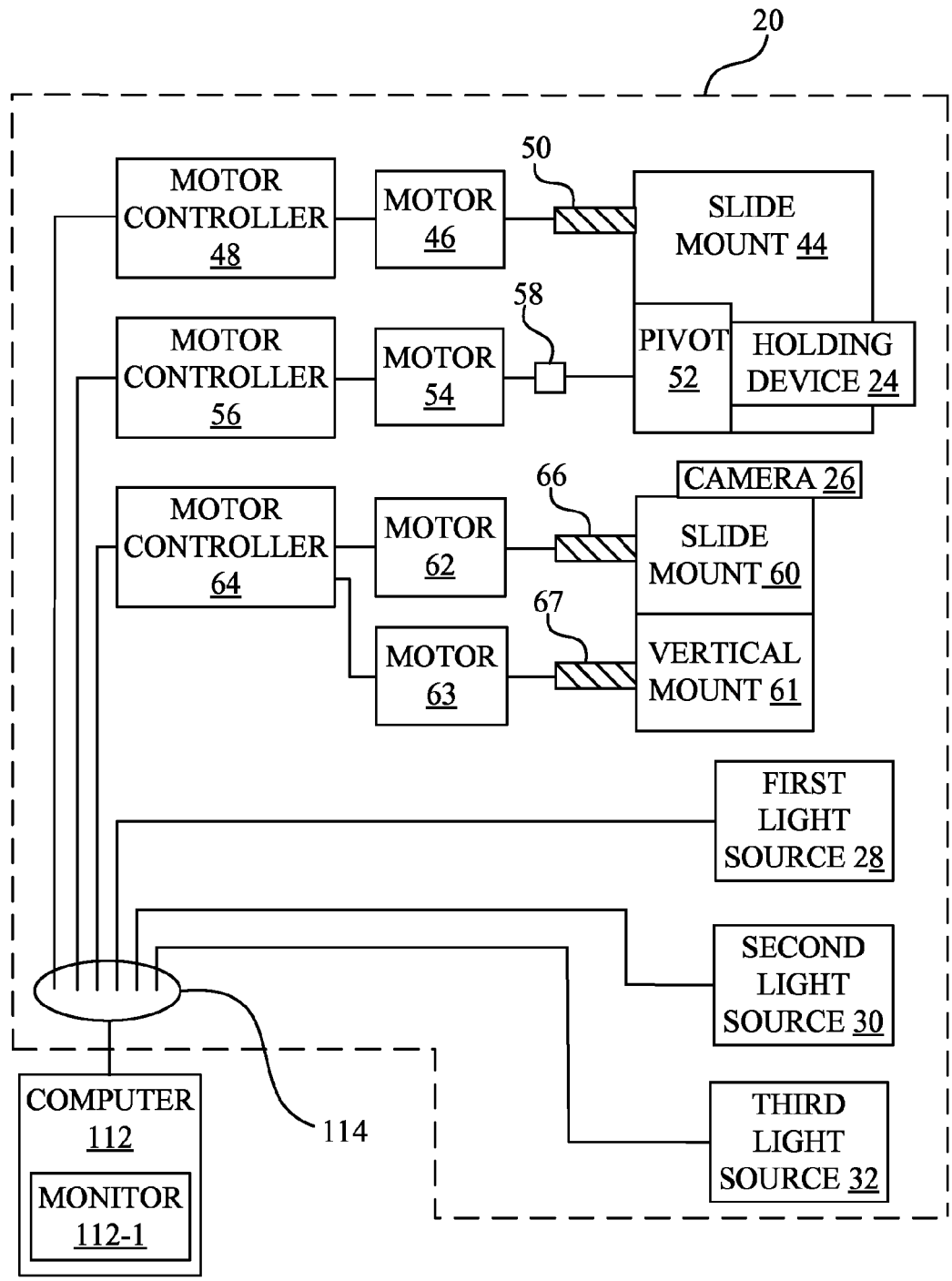
FIG. 5 is a schematic illustration of the apparatus of FIGS. 2-4 communicatively coupled to a computer.

During a doctor blade radius measurement, doctor blade 10 is mounted in doctor blade holding device 24. For doctor blade 10, the specification on the doctor blade radius 18 of curved radial surface 16 is 800+/−50 microns. As illustrated in FIGS. 4-6, computer 112 controls motor controller 56 such that motor 54 moves pivot 52 to position doctor blade 10 at an angle A4, e.g., 20 degrees offset from the Y-axis, such that a tangent of curved radial surface 16 of doctor blade 10 lies on the Y-axis. Computer 112 controls first light source 28 and second light source 30 to generate first collimated light beam 78 and second collimated light beam 82, respectively.

Camera 26 receives a reflection of first collimated light beam 78 and second collimated light beam 82 off of the curved radial surface 16 of doctor blade 10, and a reflection pattern is sensed by camera 26 resembling the pattern shown in FIG. 14. Camera 26 generates a radius signal corresponding to radius 18 of curved radial surface 16 of doctor blade 10, as computer 112 commands motor controller 48 to move slide mount 44 such that doctor blade holding device 24, and in turn doctor blade 10, is moved along the Z-axis. The radius signal constitutes a sampling of the radius of curved radial surface 16 of doctor blade 10. The sampling rate may, for example, correspond to a fixed number of locations (e.g., about every 15.48 mm over a measurable length of 216.7 mm) along the longitudinal extent 12 of doctor blade 10, with the desired sampling rate depending for example on the accuracy desired.

Camera 26 supplies the radius signal to computer 112 for further processing to determine if the radius of doctor blade 10 is within an acceptable tolerance. For example, the radius signal corresponding to the number of sampled points measured may be curve fit to a fifth order polynomial. The data representing the radius signal and curve fit of the data may then be displayed on the monitor screen 112-1 of computer 112. If the curve fit exceeds a predefined limit (e.g., +/−50 microns) then the doctor blade may be marked as "failed".

In addition to making the doctor blade radius measurement, the X straightness may be determined. X straightness is the middle distance between the two white lines (see, e.g., FIG. 14) at each of the sampling points, which is reported to computer 112 as a slope and straightness. Then the slope is taken out using the equation:

$$ym\ new = Ym\ data - (m^*X\ data + b).$$

The equation represents X straightness is:

$$STx = \text{maximum } ym\ new - \text{minimum } ym\ new.$$

A graph of the data may be drawn on the monitor screen 112-1 of computer 112 without the slope, with the X-axis in millimeters and the Y-axis in microns. If the X straightness exceeds a predefined limit (e.g., +/−50 microns) then the doctor blade may be marked as "failed". Computer 112 may then store the X straightness data.

The discussion that follows is directed to describing various methods of the invention. In the following discussions, sometimes for convenience reference will be made to the embodiments of FIGS. 2-11. However, it is to be understood that the methods of the invention need not be limited to the embodiments of FIGS. 2-11.

Figure 16A:
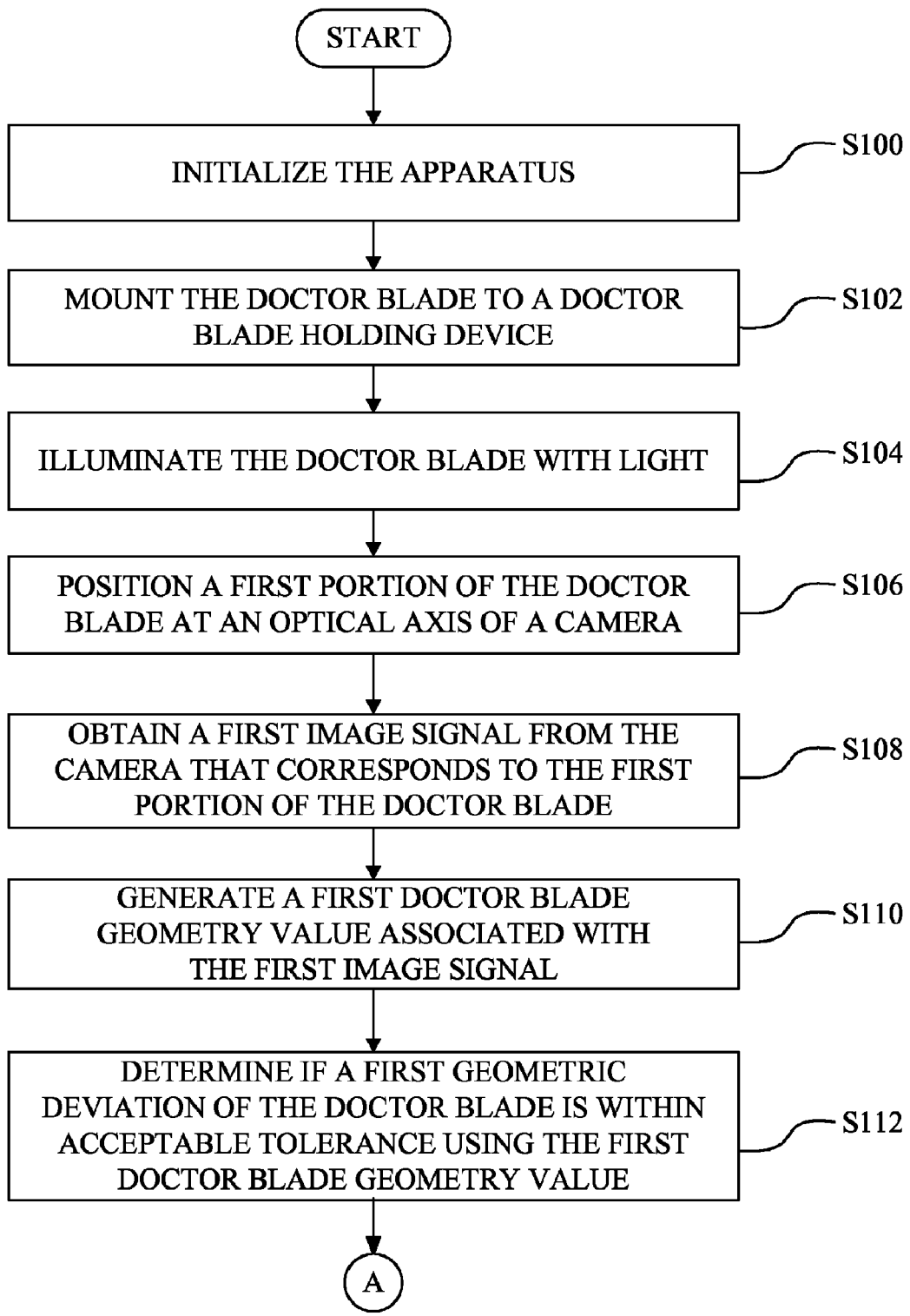
FIGS. 16A and 16B form a flowchart of a measurement method in accordance with an embodiment of the present invention.
Figure 16B:
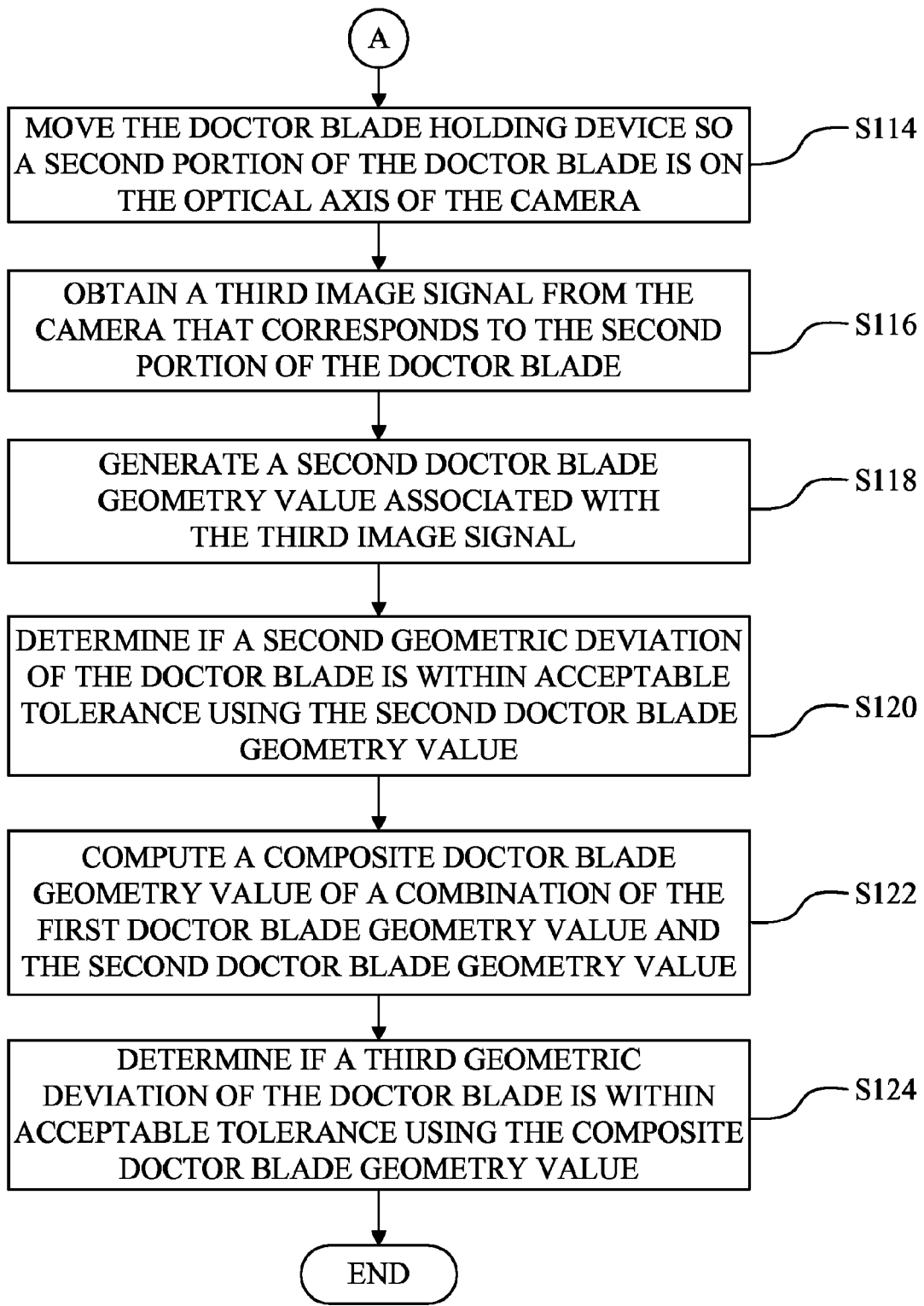

FIGS. 16A-16B are directed to a method for measuring geometric deviations of a doctor blade using an apparatus, such as apparatus 20 described above with respect to FIGS. 2-6. Acts of the method of FIG. 16A-16B may be performed, for example, by program instructions executed by computer 112.

At act S100, apparatus 20 is initialized. The initialization act is described in more detail below, but may include, for example, supplying power to camera 26 or calibrating apparatus 20.

At act S102, a doctor blade 10 is mounted to doctor blade holding device 24.

At act S104, doctor blade 10 is illuminated with light. The light may be collimated. The illumination may be provided, for example, by a single light source mounted on optical axis (X-axis) of camera 26 facing camera 26, or may be provided by two light sources located on X-Y plane of Cartesian coordinate system (see FIG. 6). In this case, doctor blade 10 is illuminated with a first light source and with a second light source, where a central axis of the first light source and a central axis of the second light source are located on a plane containing the optical axis of the camera, and the angle between the central axis of the first light source and the optical axis of the camera is the same as the angle between the central axis of the second light source and the optical axis of the camera.

At act S106, a first portion of doctor blade 10 is positioned at optical axis (X-axis) of camera 26.

At act S108, a first image signal is obtained from camera 26 corresponding to the first portion of doctor blade 10. This first image signal may be used, for example, to generate a digital gray scale image 640 pixels tall by 480 pixels wide (see, for example, image 125 of FIG. 14). The lightness of each pixel may be represented, for example, by a value from 0 through 255 using an eight bit binary value, with 0 representing minimum lightness, e.g. black or dark, and 255 representing maximum lightness, e.g. white.

Figure 19:
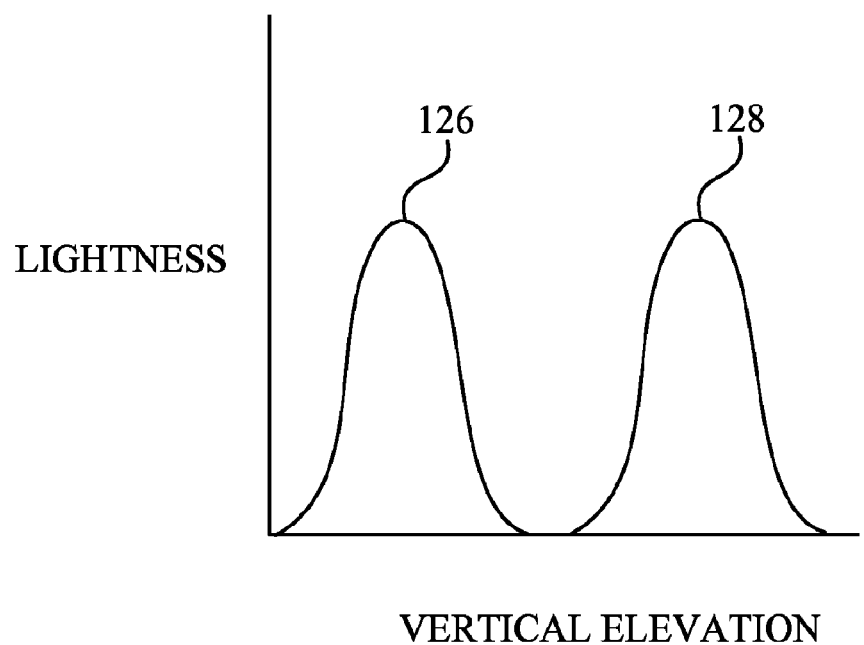
FIG. 19 is a graph of a one dimensional array of an image signal of a radius measurement.

For example, during a radius measurement, as shown in FIG. 14, image 125 contains two spaced light lines 120 of high lightness separated by a spacing 121 of low lightness. A graph of a single column of pixels of this image is illustrated in the graph in FIG. 19. The image transitions gradually from the region of low lightness to the region of high lightness. Thus, in this example, for a single column of pixels the image signal would have a first peak 126 and a second peak 128.

From the first image signal computer 112 will generate doctor blade geometry values, which are the results of measurements of geometric features of doctor blade 10. Example doctor blade geometric features that may be measured with apparatus 20 include radius, Z straightness of a feature such as a longitudinal edge 14, vertical elevation of a longitudinal edge 14, average roughness, and roughness range.

At act S110, a first doctor blade geometry value associated with the first image signal is generated. For example, during a radius measurement, the doctor blade geometry value of radius 18 corresponds to the distance between the midpoints of first peak 126 and second peak 128 (see FIG. 19). Computer 112 may locate the midpoint of each peak using, for example, a peak detection algorithm well known in the art. The pixel locations of the midpoints of the peaks are subtracted, resulting in a distance Dp in units of pixels. This distance is multiplied by a unit scaling factor, resulting in, for example, a distance Dm in units of microns. Radius 18 of doctor blade 10 may be computed using the equation:

$$R = Dm/(2^*\sin(\text{alpha}/2))$$

where R is radius and alpha is angle A1 between a first light source 28 and optical axis (X-axis) of camera 26 (see FIG. 6). Also, the absolute value of angle A1 is the same as the absolute value of angle A2 which is the angle between second light source 30 and optical axis (X-axis) of camera 26.

Peak detection algorithms are often optimized for either accuracy or robustness. Computer 112 may maximize both accuracy and robustness by converting an image signal to a one dimensional array of digital values, computing a first peak of the array using a first algorithm, for example, a peak detection algorithm maximized for robustness, and then use the result of the first algorithm as the center of an operating window for a second algorithm, for example, a more accurate peak detection algorithm, to compute a second peak. This second peak can then be used to generate a doctor blade geometry value as described above.

At act S112, it is determined if a first geometric deviation of doctor blade 10 is within acceptable tolerance using the first doctor blade geometry value. If the first geometric deviation of doctor blade 10, such as for example radius, is not within acceptable tolerance then doctor blade 10 may be marked as "failed". The determination may be made, for example, by subtracting the first doctor blade geometry value from a target doctor blade geometry value and comparing the result to an acceptable tolerance.

The first doctor blade geometry value may also be compared to a doctor blade geometry threshold, and if the first doctor blade geometry value exceeds the doctor blade geometry threshold computer 112 may alert an operator, for example, by displaying a message on monitor screen 112-1. For example, an excessively large average roughness measurement may be caused by dust on doctor blade 10, and computer 112 may instruct the operator to clean doctor blade 10 and restart the measurements.

The process described above may be used to measure geometric deviations of a plurality of doctor blades by mounting each next doctor blade 10 to doctor blade holding device 24 and repeating, for example, acts S102 through S112 for a next doctor blade 10 of a plurality of doctor blades.

The process may continue for a particular doctor blade 10, e.g., the doctor blade that was previously processed in acts S102-S112, for taking additional measurements associated with the current geometric deviation, and/or for checking the particular doctor blade 10 under criteria for one or more other geometric deviations.

At act S114, doctor blade holding device 24 is moved so a second portion of doctor blade 10 is on optical axis (X-axis) of camera 26. The movement may include, for example, rotating doctor blade holding device 24 about an axis orthogonal to optical axis (X-axis) of camera 26. Such rotation may take place if the previous measurement was of radius 18 of doctor blade 10 and the next measurement is a Z straightness measurement of longitudinal edge 14 of doctor blade 10, since different rotations may be used for radius measurements and Z straightness measurements. However, the movement may also include, for example, linearly moving doctor blade holding device 24 along an axis orthogonal to optical axis (X-axis) of camera 26, if, for example, the next measurement is of the same type as the previous measurement and a different region of doctor blade 10 is to be measured.

At act S116, a third image signal is obtained from camera 26 corresponding to the second portion of doctor blade 10. The third image signal may be, for example, a digital gray scale image as described above.

At act S118, a second doctor blade geometry value is generated associated with the third image signal, as described above for act S110. Example doctor blade geometric features that may be measured with apparatus 20 include radius, Z straightness of a feature such as a longitudinal edge 14, vertical elevation of a longitudinal edge 14, average roughness, and roughness range.

Alternatively, computer 112 may generate a preliminary second doctor blade geometry value and compute the deviation between it and the first doctor blade geometry value. Computer 112 may substitute the first doctor blade geometry value for the preliminary second doctor blade geometry value to serve as the second doctor blade geometry value if the deviation exceeds a deviation threshold. In this way, a flawed data point may be discarded and replaced with a previous data point or, for example, with an average of previous data points. An example of a flawed data point is a radius measurement that is equal to zero.

At act S120, it is determined if a second geometric deviation of doctor blade 10 is within acceptable tolerance using the second doctor blade geometry value. If the second geometric deviation of the doctor blade is not within acceptable tolerance then doctor blade 10 may be marked as "failed". For example, the second generated doctor blade geometry value may be a Z straightness measurement, which would have a different predefined tolerance than the first generated doctor blade geometry value, if, for example, the first generated doctor blade geometry value is a radius measurement. Thus, without requiring user interaction, apparatus 20 may determine if multiple types of geometric parameters are within acceptable tolerance on a given doctor blade 10. Also, without requiring user interaction, apparatus 20 may determine if multiple regions of doctor blade 10 are within acceptable tolerance.

At act S122, computer 112 computes a composite doctor blade geometry value of a combination of the first doctor blade geometry value and the second doctor blade geometry value. The composite doctor blade geometry value may be, for example, an integral of the absolute value of the first doctor blade geometry value and second doctor blade geometry value. If, for example, the geometry values are straightness measurements, the composite value could represent the integral of the straightness along doctor blade 10.

At act S124, it is determined if a third geometric deviation of doctor blade 10 is within acceptable tolerance using the composite doctor blade geometry value. If the third geometric deviation of doctor blade 10 is not within acceptable tolerance then doctor blade 10 may be marked as "failed". For example, there may be an acceptable tolerance for the integral of the straightness along doctor blade 10. Print banding is the formation of a wide (10 to 30 mm) dark or light vertical line on the printed page, and may be caused by a doctor blade with an unacceptably high integral of the straightness along doctor blade 10.

Another example of a composite doctor blade geometry value, as may be determined at act S122, is the change in radius from the first generated doctor blade geometry value to the second generated doctor blade geometry value. A radius change over a small area of doctor blade 10 may cause white lines in the output of the electrophotographic image forming device.

Figure 17:
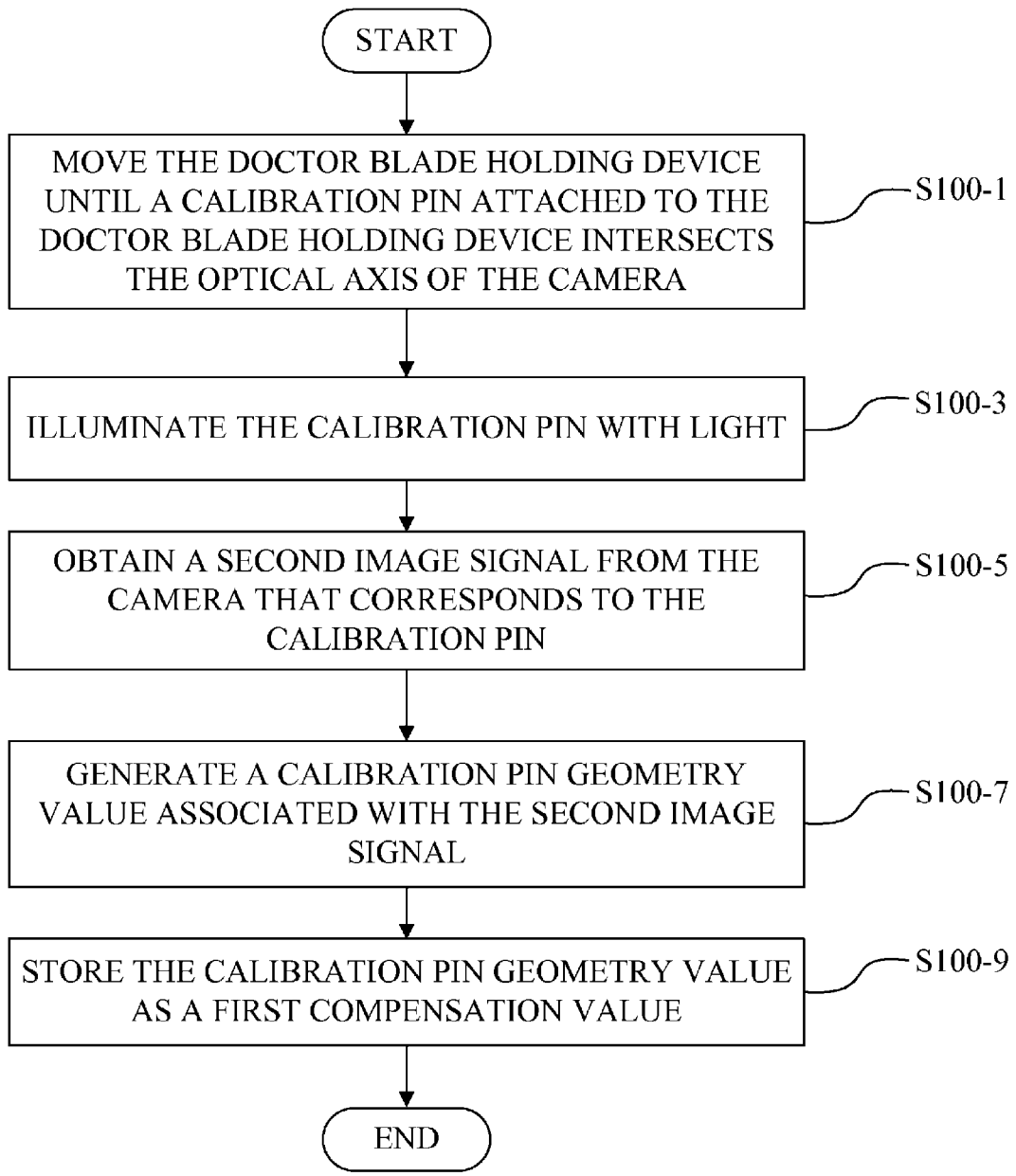
FIG. 17 is a flowchart of a calibration method in accordance with an embodiment of the present invention.

The initializing in act S100 will now be further described with respect to FIG. 17. The initializing in act S100 may include, for example, calibration of a unit scaling factor used to convert measurements with units of pixels to units of, e.g., microns. Also, the initializing in act S100 may include calibration of a radius scaling factor used to correct errors in radius measurements. These scaling factors may be referred to as compensation values. Both of these compensation values may be determined using the acts in FIG. 17.

Referring to FIG. 17, at act S100-1, doctor blade holding device 24 is moved until a calibration pin attached to doctor blade holding device 24 intersects optical axis (X-axis) of camera 26. The calibration pin may be, for example, a radius calibration pin 104 or a Z-axis (calibration) pin 102.

At act S100-3, the calibration pin is illuminated with light. For example, when computing a unit scaling factor, the calibration pin is illuminated from the side of the calibration pin opposite camera 26. Alternatively, when computing a radius scaling factor, the calibration pin is illuminated by two light sources from the same side of the calibration pin as camera 26.

At act S100-5, a second image signal is obtained from camera 26 that corresponds to the calibration pin.

At act S100-7, a calibration pin geometry value is generated associated with the second image signal. If, for example, the calibration pin is radius calibration pin 104, the calibration pin geometry value is a measurement of the radius of the calibration pin. The measured radius of the calibration pin is determined using the method described above for act S110. The actual radius of the calibration pin is divided by the measured radius of the calibration pin to generate the radius scaling factor, which is stored for later use.

If, for example, the calibration pin is Z-axis (calibration) pin 102, the second image signal will look like FIG. 12. A shadow 116 establishes a dark horizontal region within the image signal, surrounded by light regions. Computer 112 locates shadow 116, for example, by identifying the pixel location of a first transition from light to dark lines in the second image signal, for example, at the bottom of shadow 116, and identifying the pixel location of a second transition from light to dark lines in the second image signal, for example, at the top of shadow 116. Computer 112 subtracts these pixel locations to determine a number of camera pixels between the first transition and the second transition. Here, the calibration pin geometry value is the diameter of the calibration pin. A calibration pin geometry value is computed by dividing the number of camera pixels by the diameter of the calibration pin. The calibration pin geometry value may be expressed, for example, in microns. This is an example of a vertical distance (Y-axis) calibration.

At act S100-9, the calibration pin geometry value is stored as a first compensation value.

The first doctor blade geometry value may be generated by arithmetically applying the first compensation value to a preliminary first doctor blade geometry value. For example, a measurement of a radius 18, as described above, may generate a preliminary doctor blade geometry value, which is scaled by the first compensation value, for example, the radius scaling factor, to generate a corrected radius measurement. A corrected radius measurement is an example of a corrected doctor blade geometry value.

Figure 18A:
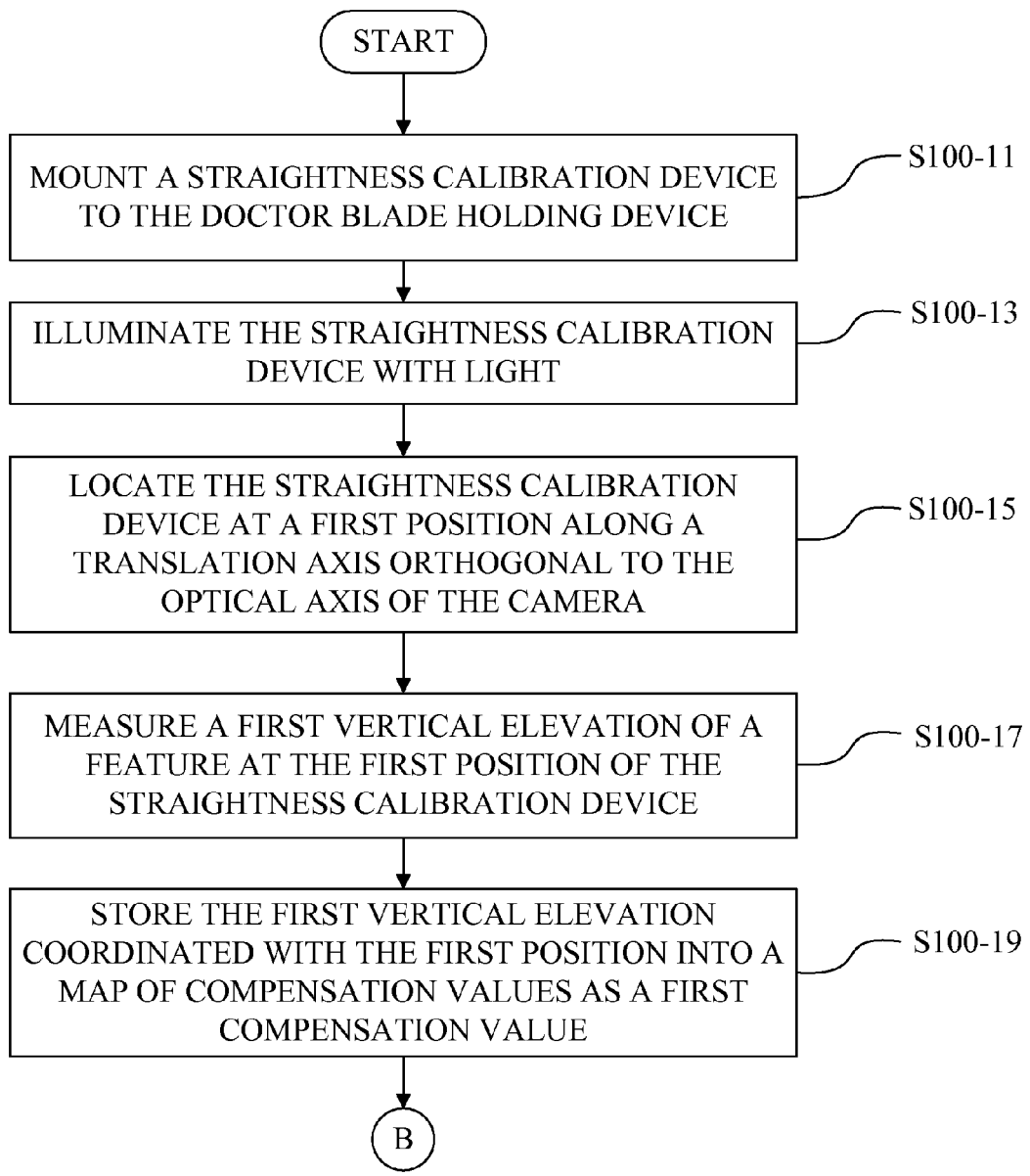
FIGS. 18A and 18B form a flowchart of another calibration method in accordance with an embodiment of the present invention.
Figure 18B:
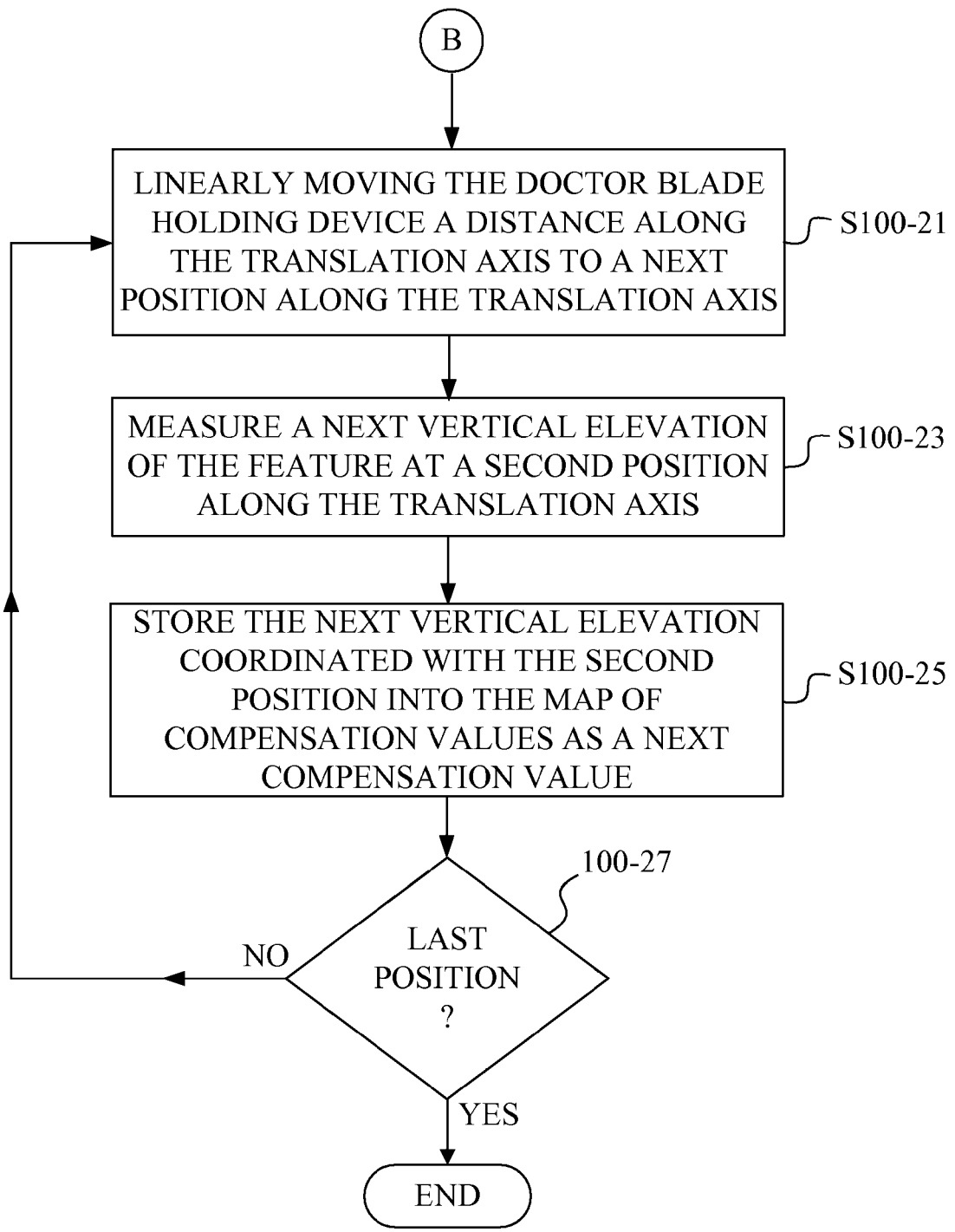

Referring to FIGS. 18A-18B, the initializing in act S100 may also include calibration of a map of compensation values for correcting straightness measurements along the length of doctor blade holding device 24. Errors in the straightness measurement may be generated, for example, by vertical travel of doctor blade holding device 24 as it is moved along Z-axis. The map of compensation values may be generated using the acts in FIGS. 18A-18B. This is an example of a straightness calibration.

Referring to FIGS. 18A-18B, at act S100-11, a straightness calibration device 106 is mounted to doctor blade holding device 24. As previously described, straightness calibration device 106 contains a straight calibration line 110 extending along Z-axis.

At act S100-13, straightness calibration device 106 is illuminated with light. The light passes through straight calibration line 110 but does not pass through opaque coating 108-1.

At act S100-15, straightness calibration device 106 is located at a first position along a translation axis orthogonal to the optical axis (X-axis) of camera 26, for example, Z-axis. A portion of straight calibration line 110 is located, for example, intersecting optical axis (X-axis) of camera 26.

At act S100-17, a first vertical elevation of a feature at the first position of straightness calibration device 106 is measured.

At act S100-19, the first vertical elevation is stored coordinated with the first position into a map of compensation values as a first compensation value, for example, at an offset of zero. The vertical elevation measurement may be scaled, averaged, or otherwise arithmetically manipulated before being stored in the map of compensation values.

At act S100-21, doctor blade holding device 24 is linearly moved a distance along a translation axis, for example, Z-axis, to a next position along the translation axis. The next position, for example, is separated from the first position by a sampling distance.

At act S100-23, the next vertical elevation of the feature is measured at a second position along the translation axis.

At act S100-25, the next vertical elevation is stored coordinated with the second position into the map of compensation values as a next compensation value, for example, at an offset of one, which corresponds to the position located one sampling distance from the starting position. In a similar fashion, if, for example, the second position were located two sampling distances from the first position the vertical elevation would be stored in the map of compensation values at an offset of two.

At act S100-27, it is determined if the current position is, for example, the end of straightness calibration device 106. If it is not, then computer 112 repeats acts S100-21, S100-23, and S100-25, for each position of a plurality of positions along doctor blade 10. Each new vertical elevation may be stored, for example, in the map of compensation values at an offset coordinated with the new position.

The map of compensation values may be used to correct errors in a later measurement of the straightness of doctor blade 10. For example, a straightness measurement is made at a position along doctor blade 10, and is assigned to a preliminary doctor blade geometry value. The current position of doctor blade holding device 24 along the translation axis, for example, Z-axis, is determined and is, for example, divided by the sampling distance. The result is converted to an integer, and is used as an offset into the map of compensation values to select a current compensation value from the map of compensation values which corresponds to the current position. The current compensation value is arithmetically applied to a preliminary doctor blade geometry value by, for example, subtracting the current compensation value from the preliminary doctor blade geometry value to generate a corrected doctor blade geometry value. Other indexing schemes are envisioned, such as interpolating the current compensation value from adjacent elements of the map of compensation values.

Figure 20:
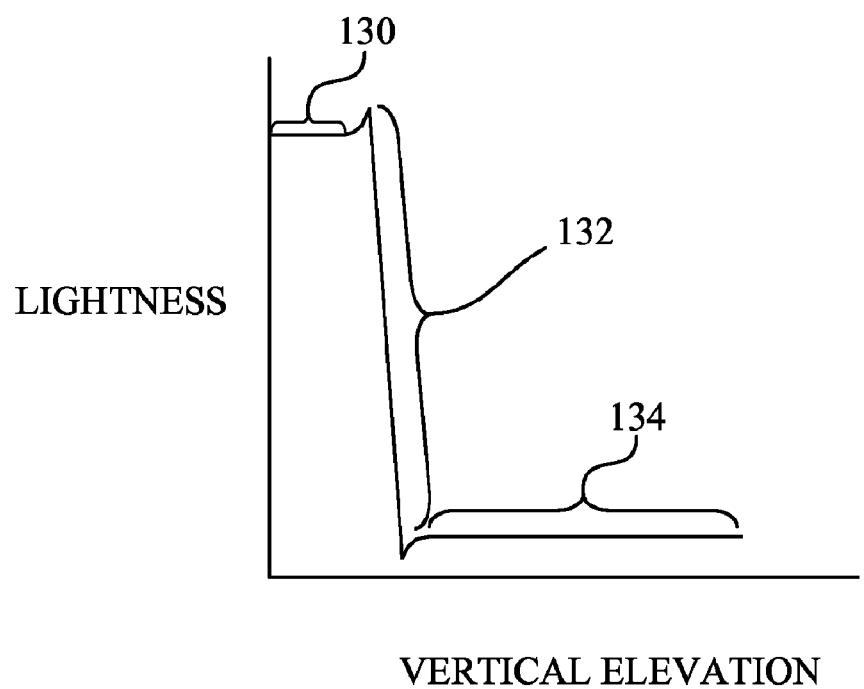
FIG. 20 is a graph of a one dimensional array of an image signal of a straightness measurement.

The accuracy of the previous methods may be enhanced by automatically focusing camera 26 each time a new doctor blade, and/or a new position along a doctor blade, is imaged. Computer 112 obtains a preliminary image signal from camera 26 that corresponds to an edge portion of doctor blade 10, for example, longitudinal edge 14 of doctor blade 10. The preliminary image signal is converted to a one dimensional array of digital values by, for example, summing the lightness of each pixel in a row of the preliminary image signal. A graph of the vertical elevation of each array element versus lightness is shown in FIG. 20. A region of high lightness 130 falls through a transition region 132 to a region of low lightness 134. Both region of high lightness 130 and region of low lightness 134 may be of approximately uniform lightness. Transition region 132 is dominated by a line with a slope. Computer 112 identifies a first region of the one dimensional array corresponding to approximately uniform high image signal lightness, for example, region of high lightness 130. Computer 112 identifies a second region of the one dimensional array corresponding to approximately uniform low image signal lightness, for example, region of low lightness

134. Computer 112 identifies a third region of the one dimensional array corresponding to a transition between the first region and the second region, for example, transition region 132. The slope of the third region is computed, for example, transition region 132. Computer 112 moves a camera mount that mounts camera 26, for example, by energizing motor 62 to move mount 36 for mounting camera 26, along the optical axis (X-axis) of camera 26 until the slope is maximized. Camera 26 is in focus when this slope is maximized.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for measuring geometric deviations of a doctor blade using an apparatus in communication with a computing device, comprising:
    (a) initializing said apparatus;
    (b) mounting said doctor blade to a doctor blade holding device of said apparatus;
    (c) illuminating, by said apparatus, said doctor blade with light;
    (d) positioning, by said apparatus, a first portion of said doctor blade at an optical axis of a camera of said apparatus;
    (e) obtaining a first image signal from said camera that corresponds to said first portion of said doctor blade;
    (f) generating, by said computing device, a first doctor blade geometry value associated with said first image signal; and
    (g) determining, by said computing device, if a first geometric deviation of said doctor blade is within acceptable tolerance using said first doctor blade geometry value;
    wherein said illuminating comprises illuminating said doctor blade with a first light source and illuminating said doctor blade with a second light source, wherein a central axis of said first light source and a central axis of said second light source are located on a plane containing said optical axis of said camera, and wherein the angle between said central axis of said first light source and said optical axis of said camera is the same as the angle between said central axis of said second light source and said optical axis of said camera.

2. The method of claim 1, wherein said first doctor blade geometry value is one of radius, average roughness, roughness range, and vertical elevation of said doctor blade.

3. The method of claim 1, wherein said determining includes:
    comparing said first doctor blade geometry value to a doctor blade geometry threshold; and
    alerting an operator if said first doctor blade geometry value exceeds said doctor blade geometry threshold.

4. The method of claim 1, further comprising:
    positioning a second portion of said doctor blade at said optical axis of said camera; and
    repeating (e), (f), and (g) for said second portion of said doctor blade.

5. The method of claim 1, wherein said positioning comprises rotating said doctor blade holding device about an axis substantially orthogonal to said optical axis of said camera.

6. The method of claim 1, wherein said positioning comprises linearly moving said doctor blade holding device along an axis substantially orthogonal to said optical axis of said camera.

7. A method for measuring geometric deviations of a doctor blade using an apparatus in communication with a computing device, comprising:
    (a) initializing said apparatus;
    (b) mounting said doctor blade to a doctor blade holding device of said apparatus;
    (c) illuminating, by said apparatus, said doctor blade with light;
    (d) positioning, by said apparatus, a first portion of said doctor blade at an optical axis of a camera of said apparatus;
    (e) obtaining a first image signal from said camera that corresponds to said first portion of said doctor blade;
    (f) generating, by said computing device, a first doctor blade geometry value associated with said first image signal; and
    (g) determining, by said computing device, if a first geometric deviation of said doctor blade is within acceptable tolerance using said first doctor blade geometry value;
    wherein said initializing said apparatus includes:
    moving said doctor blade holding device until a calibration pin attached to said doctor blade holding device intersects said optical axis of said camera;
    illuminating said calibration pin with light;
    obtaining a second image signal from said camera that corresponds to said calibration pin;
    generating a calibration pin geometry value associated with said second image signal; and
    storing said calibration pin geometry value as a first compensation value.

8. The method of claim 7, wherein said calibration pin geometry value is one of diameter and radius of said calibration pin.

9. The method of claim 7, wherein said generating a calibration pin geometry value includes:
    identifying a first transition from light to dark lines in said second image signal;
    identifying a second transition from light to dark lines in said second image signal;
    determining a number of camera pixels between said first transition and said second transition; and
    computing said calibration pin geometry value by dividing said number of camera pixels by the diameter of said calibration pin.

10. The method of claim 7, wherein said first doctor blade geometry value is generated by arithmetically applying said first compensation value to a preliminary first doctor blade geometry value.

11. A method for measuring geometric deviations of a doctor blade using an apparatus in communication with a computing device, comprising:
    (a) initializing said apparatus;
    (b) mounting said doctor blade to a doctor blade holding device of said apparatus;
    (c) illuminating, by said apparatus, said doctor blade with light;
    (d) positioning, by said apparatus, a first portion of said doctor blade at an optical axis of a camera of said apparatus;
    (e) obtaining a first image signal from said camera that corresponds to said first portion of said doctor blade;

(f) generating, by said computing device, a first doctor blade geometry value associated with said first image signal; and (g) determining, by said computing device, if a first geometric deviation of said doctor blade is within acceptable tolerance using said first doctor blade geometry value;

wherein said illuminating comprises illuminating said doctor blade with a first light source and illuminating said doctor blade with a second light source, wherein a central axis of said first light source and a central axis of said second light source are located on a plane containing said optical axis of said camera;

wherein said initializing said apparatus includes:
  (a1) mounting a straightness calibration device to said doctor blade holding device;
  (a2) illuminating said straightness calibration device with light;
  (a3) locating said straightness calibration device at a first position along a translation axis orthogonal to said optical axis of said camera;
  (a4) measuring a first vertical elevation of a feature at said first position of said straightness calibration device;
  (a5) storing said first vertical elevation coordinated with said first position into a map of compensation values as a first compensation value;
  (a6) linearly moving said doctor blade holding device a distance along said translation axis to a next position along said translation axis;
  (a7) measuring a next vertical elevation of said feature at a second position along said translation axis;
  (a8) storing said next vertical elevation coordinated with said second position into said map of compensation values as a next compensation value; and
  (a9) repeating acts (a6), (a7), and (a8) for each position of a plurality of positions along said doctor blade.

12. The method of claim 11, wherein said generating a first doctor blade geometry value includes:
  determining a current position of said doctor blade holding device along said translation axis;
  selecting a current compensation value from said map of compensation values which corresponds to said current position; and
  arithmetically applying said current compensation value to a preliminary first doctor blade geometry value.

13. A method for measuring geometric deviations of a doctor blade using an apparatus in communication with a computing device, comprising:
  (a) initializing said apparatus;
  (b) mounting said doctor blade to a doctor blade holding device of said apparatus;
  (c) illuminating, by said apparatus, said doctor blade with light;
  (d) positioning, by said apparatus, a first portion of said doctor blade at an optical axis of a camera of said apparatus;
  (e) obtaining a first image signal from said camera that corresponds to said first portion of said doctor blade;
  (f) generating, by said computing device, a first doctor blade geometry value associated with said first image signal; and
  (g) determining, by said computing device, if a first geometric deviation of said doctor blade is within acceptable tolerance using said first doctor blade geometry value;

wherein said illuminating comprises illuminating said doctor blade with a first light source and illuminating said doctor blade with a second light source, wherein a central axis of said first light source and a central axis of said second light source are located on a plane containing said optical axis of said camera; and performing an automatic focus of said camera by:
  obtaining a preliminary image signal from said camera that corresponds to an edge portion of said doctor blade;
  converting said preliminary image signal to a one dimensional array of digital values;
  identifying a first region of said one dimensional array corresponding to approximately uniform high image signal lightness;
  identifying a second region of said one dimensional array corresponding to approximately uniform low image signal lightness;
  identifying a third region of said one dimensional array corresponding to a transition between said first region and said second region;
  computing a slope of said third region; and
  moving a camera mount that mounts said camera along said optical axis of said camera until said slope is maximized.

14. A method for measuring geometric deviations of a doctor blade using an apparatus in communication with a computing device, comprising:
  (a) initializing said apparatus;
  (b) mounting said doctor blade to a doctor blade holding device of said apparatus;
  (c) illuminating, by said apparatus, said doctor blade with light;
  (d) positioning, by said apparatus, a first portion of said doctor blade at an optical axis of a camera of said apparatus;
  (e) obtaining a first image signal from said camera that corresponds to said first portion of said doctor blade;
  (f) generating, by said computing device, a first doctor blade geometry value associated with said first image signal; and
  (g) determining, by said computing device, if a first geometric deviation of said doctor blade is within acceptable tolerance using said first doctor blade geometry value;

wherein said generating a first doctor blade geometry value includes:
  converting said first image signal to a one dimensional array of digital values;
  computing a first peak of said array using a first algorithm;
  computing a second peak of said array using a second algorithm, wherein a result of said first algorithm is used by said second algorithm; and
  using said second peak to generate said first doctor blade geometry value.

15. A method for measuring geometric deviations of a doctor blade using an apparatus in communication with a computing device, comprising:
  (a) initializing said apparatus;
  (b) mounting said doctor blade to a doctor blade holding device of said apparatus;
  (c) illuminating, by said apparatus, said doctor blade with light;
  (d) positioning, by said apparatus, a first portion of said doctor blade at an optical axis of a camera of said apparatus;

(e) obtaining a first image signal from said camera that corresponds to said first portion of said doctor blade;

(f) generating, by said computing device, a first doctor blade geometry value associated with said first image signal;

(g) determining, by said computing device, if a first geometric deviation of said doctor blade is within acceptable tolerance using said first doctor blade geometry value;

(h) moving, by said apparatus, said doctor blade holding device so a second portion of said doctor blade is on said optical axis of said camera;

(i) obtaining a third image signal from said camera that corresponds to said second portion of said doctor blade;

(j) generating, by said computing device, a second doctor blade geometry value associated with said third image signal; and (k) determining, by said computing device, if a second geometric deviation of said doctor blade is within acceptable tolerance using said second doctor blade geometry value, wherein said moving of said doctor blade holding device includes rotating said doctor blade holding device about an axis orthogonal to said optical axis of said camera.

16. The method of claim 15, wherein said moving said doctor blade holding device includes linearly moving said doctor blade holding device along said axis substantially orthogonal to said optical axis of said camera.

17. The method of claim 15, wherein said second doctor blade geometry value is one of radius, average roughness, roughness range, and vertical elevation of said doctor blade.

18. The method of claim 15, wherein said generating a second doctor blade geometry value includes:

computing a deviation between a preliminary second doctor blade geometry value and said first doctor blade geometry value;

comparing said deviation to a deviation threshold; and substituting said first doctor blade geometry value for said preliminary second doctor blade geometry value to serve as said second doctor blade geometry value if said deviation exceeds said deviation threshold.

19. The method of claim 15, further comprising:

(l) computing a composite doctor blade geometry value of a combination of said first doctor blade geometry value and said second doctor blade geometry value; and (m) determining if a third geometric deviation of said doctor blade is within acceptable tolerance using said composite doctor blade geometry value.

20. The method of claim 19, wherein said composite doctor blade geometry value is an integral of the absolute value of said first doctor blade geometry value and said second doctor blade geometry value.

21. The method of claim 15, further comprising repeating one or more of acts (a) through (k) for a next doctor blade of a plurality of doctor blades.

22. A method for measuring geometric deviations of an elongated blade using an apparatus in communication with a computing device, comprising:

(a) initializing the apparatus;

(b) mounting the blade to a blade holding device of the apparatus;

(c) positioning, by the apparatus, a first portion of the blade along an optical axis of a camera of the apparatus;

(d) illuminating, by the apparatus, the blade with light;

(e) obtaining a first image signal from the camera that corresponds to the first portion of the blade;

(f) generating, by the computing device, a first blade geometry value associated with the first image signal;

(g) determining, by the computing device, if a first geometric deviation of the blade is within acceptable tolerance using the first blade geometry value;

(h) moving, by the apparatus, the blade relative to an axis orthogonal to the optical axis of the camera such that a second portion of the blade is positioned along the optical axis of the camera, including rotating the blade about an axis substantially orthogonal to the optical axis of the camera; and (i) performing (e), (f), and (g) for the second portion of the blade.

23. The method of claim 22, wherein the moving comprises moving the blade in a substantially linear manner along the axis substantially orthogonal to the optical axis of the camera.

* * * * *